United States Patent
Mimura et al.

(10) Patent No.: US 11,482,726 B2
(45) Date of Patent: Oct. 25, 2022

(54) SOLID ELECTROLYTE COMPOSITION, SOLID ELECTROLYTE-CONTAINING SHEET, ALL-SOLID STATE SECONDARY BATTERY, AND METHOD FOR MANUFACTURING SOLID ELECTROLYTE-CONTAINING SHEET AND ALL-SOLID STATE SECONDARY BATTERY

(71) Applicant: FUJIFILM Corporation, Tokyo (JP)

(72) Inventors: Tomonori Mimura, Kanagawa (JP); Hiroaki Mochizuki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 51 days.

(21) Appl. No.: 16/746,975

(22) Filed: Jan. 20, 2020

(65) Prior Publication Data

US 2020/0153042 A1 May 14, 2020

Related U.S. Application Data

(63) Continuation of application No. PCT/JP2018/026634, filed on Jul. 17, 2018.

(30) Foreign Application Priority Data

Jul. 21, 2017 (JP) .............................. JP2017-141738

(51) Int. Cl.
*H01M 10/0565* (2010.01)
*H01M 4/134* (2010.01)
*H01M 10/0562* (2010.01)
*H01M 4/02* (2006.01)

(52) U.S. Cl.
CPC ....... *H01M 10/0565* (2013.01); *H01M 4/134* (2013.01); *H01M 10/0562* (2013.01); *H01M 2004/027* (2013.01); *H01M 2004/028* (2013.01); *H01M 2300/008* (2013.01); *H01M 2300/0071* (2013.01); *H01M 2300/0082* (2013.01)

(58) Field of Classification Search
None
See application file for complete search history.

(56) References Cited

U.S. PATENT DOCUMENTS

| | | | |
|---|---|---|---|
| 5,755,985 A | 5/1998 | Vallee et al. | |
| 6,433,996 B1 | 8/2002 | Hata et al. | |
| 6,537,468 B1 * | 3/2003 | Hata | C08F 8/00 |
| | | | 252/511 |
| 6,576,372 B1 | 6/2003 | Hata et al. | |
| 8,318,361 B2 | 11/2012 | Yu et al. | |
| 10,468,718 B2 | 11/2019 | Lee et al. | |
| 2006/0182956 A1 * | 8/2006 | Kamiya | C09J 7/381 |
| | | | 428/355 R |
| 2008/0139710 A1 * | 6/2008 | Tsukada | C08L 101/12 |
| | | | 524/100 |
| 2012/0315547 A1 | 12/2012 | Itoh et al. | |
| 2017/0301950 A1 | 10/2017 | Mimura et al. | |
| 2020/0153033 A1 * | 5/2020 | Mimura | H01M 4/382 |

FOREIGN PATENT DOCUMENTS

| | | | |
|---|---|---|---|
| CN | 1135267 | | 11/1996 |
| CN | 1302444 | | 7/2001 |
| CN | 101512824 | | 8/2009 |
| CN | 102770999 | | 11/2012 |
| CN | 105449273 | | 3/2016 |
| JP | 2000222939 | | 8/2000 |
| JP | 2000319531 | | 11/2000 |
| JP | 2001291529 | | 10/2001 |
| JP | 2003229019 | | 8/2003 |
| JP | 2004059865 | | 2/2004 |
| JP | 2016-139511 | * | 8/2016 |
| WO | 0056797 | | 9/2000 |
| WO | 2016129427 | | 8/2016 |

OTHER PUBLICATIONS

Machine translation of JP 2016-139511, published on Aug. 4, 2016 (Year: 2016).*
MDI Handbook, BASF, 2019, available online https://polyurethanes.basf.us/files/pdf/2019-MDI-Handbook_EL.pdf (Year: 2019).*
Glyether EJ-190 Sorbitol Polyglycidyl Ether, JSI Co., Ltd, date unknown, available online http://eng.epoxyresin.co.kr/upload/20110228/EJ-190,190T(NTDS).pdf.*

(Continued)

*Primary Examiner* — Anca Eoff
(74) *Attorney, Agent, or Firm* — JCIPRNET

(57) ABSTRACT

Provided are a solid electrolyte composition containing a polymer (A) having a mass average molecular weight of 5,000 or more, an electrolyte salt (B) having an ion of a metal belonging to Group I or II of the periodic table, a compound (C) having three or more polymerization reactive groups, and a compound (D) having two or more polymerization reactive groups that are polymerization reactive groups different from the polymerization reactive groups that the compound (C) has and are capable of causing a polymerization reaction with the polymerization reactive groups that the compound (C) has, a solid electrolyte-containing sheet and an all-solid state secondary battery that are obtained using the solid electrolyte composition, and methods for manufacturing a solid electrolyte-containing sheet and an all-solid state secondary battery.

18 Claims, 1 Drawing Sheet

(56) References Cited

OTHER PUBLICATIONS

Pentaerythritol glycidyl ether, Pub-Chem, data unknown, available online https://pubchem.ncbi.nlm.nih.gov/compound/Pentaerythritol-glycidyl-ether.*
"Office Action of Japan Counterpart Application", dated Sep. 1, 2020, with English translation thereof, p. 1-p. 6.
"International Search Report (Form PCT/ISA/210) of PCT/JP2018/026634," dated Aug. 28, 2018, with English translation thereof, pp. 1-4.
"Written Opinion of the International Searching Authority (Form PCT/ISA/237) of PCT/JP2018/026634," dated Aug. 28, 2018, with English translation thereof, pp. 1-11.
"Office Action of China Counterpart Application", dated Jul. 27, 2022, with English translation thereof, p. 1-p. 18.

* cited by examiner

SOLID ELECTROLYTE COMPOSITION, SOLID ELECTROLYTE-CONTAINING SHEET, ALL-SOLID STATE SECONDARY BATTERY, AND METHOD FOR MANUFACTURING SOLID ELECTROLYTE-CONTAINING SHEET AND ALL-SOLID STATE SECONDARY BATTERY

CROSS-REFERENCE TO RELATED APPLICATIONS

This application is a Continuation of PCT International Application No. PCT/JP2018/026634 filed on Jul. 17, 2018 which claims priority under 35 U.S.C. § 119 (a) to Japanese Patent Application No. JP2017-141738 filed in Japan on Jul. 21, 2017. Each of the above applications is hereby expressly incorporated by reference, in its entirety, into the present application.

BACKGROUND OF THE INVENTION

1. Field of the Invention

The present invention relates to a solid electrolyte composition, a solid electrolyte-containing sheet, an all-solid state secondary battery, and methods for manufacturing a solid electrolyte-containing sheet and an all-solid state secondary battery.

2. Description of the Background Art

Lithium ion secondary batteries are storage batteries which have a negative electrode, a positive electrode, and an electrolyte sandwiched between the negative electrode and the positive electrode and enable charging and discharging by the reciprocal migration of lithium ions between both electrodes. In lithium ion secondary batteries of the related art, an organic electrolytic solution has been used as the electrolyte. However, in organic electrolytic solutions, liquid leakage is likely to occur, there is a concern that a short circuit and ignition may be caused in batteries due to overcharging or overdischarging, and there is a demand for additional improvement in safety and reliability.

As a secondary battery capable of improving safety and the like that are considered as issues for lithium ion secondary batteries in which an organic electrolytic solution is used, studies of all-solid state secondary batteries in which a negative electrode, an electrolyte, and a positive electrode are all solid are underway.

For example, all-solid state secondary batteries in which a (dry) polymer electrolyte is used instead of the organic electrolytic solution are exemplified. As such all-solid state secondary batteries, for example, JP2003-229019A describes a secondary battery in which an electrolyte including a first polymer compound having a crosslinking structure in which a (meth)acrylate compound is crosslinked by the chain polymerization (radical polymerization) of a carbon-carbon double bond, a second compound, at least one of a third compound having a larger molecular weight than the second compound or a second polymer compound having a crosslinking structure in which the third compound is crosslinked, and an electrolyte salt is used. In addition, JP2000-222939A describes a secondary battery in which an electrolyte including a compound in which a (meth)acrylate compound having an ether bond and a crosslinking group is crosslinked in a crosslinking group ((meth)acryloyl group) by the radical polymerization of a carbon-carbon double bond, an electrolyte salt, and a polymer compound dissolving this electrolyte salt is used.

SUMMARY OF THE INVENTION

In the polymer electrolyte, as a polymer capable of dissolving the electrolyte salt and imparting ion conductivity to the polymer electrolyte, a polyalkylene oxide such as polyethylene oxide (PEO), furthermore, a polymer having an alkyleneoxy group in a part of the molecular structure (polyether), and the like are mainly used. In the case of using (repeatedly charging and discharging) an all-solid state secondary battery in which a polymer electrolyte containing the above-described polymer is used, lithium is precipitated in a tree shape (dendrite) due to the reduction reaction of a lithium ion, a short-circuit is caused, and a voltage abnormal behavior such as voltage drop occurs (the all-solid state secondary battery is poor in terms of durability). As a result of studying an all-solid state secondary battery in which the polymer electrolyte is used from the viewpoint of satisfying the additional improvement in ion conductivity which has been demanded for all-solid state secondary batteries in the related art, the present inventors found that the enhancement of the ion transportation characteristic of the polymer electrolyte significantly impairs the durability of all-solid state secondary batteries. For example, it was found that, in a case in which the degree of crosslinking of the polymer compound or (meth)acrylate compound included in the polymer electrolyte described in JP2003-229019A and JP2000-222939A is increased, improvement in durability is expected, but the ion conductivity decreases, and the above-described demand cannot be satisfied.

An object of the present invention is to provide a solid electrolyte composition capable of imparting not only a high ion conductivity but also excellent durability to an all-solid state secondary battery to be obtained in the case of being used as a layer constituent material of the all-solid state secondary battery. In addition, another object of the present invention is to provide a solid electrolyte-containing sheet and an all-solid state secondary battery that can be obtained using the solid electrolyte composition. Furthermore, still another object of the present invention is to provide a method for manufacturing the solid electrolyte-containing sheet and a method for manufacturing the all-solid state secondary battery respectively.

As a result of intensive studies, the present inventors found that a composition containing a polymer compound (A) having a mass average molecular weight of 5,000 or more (in the present invention, simply referred to as the polymer), an electrolyte salt (B) having an ion of a metal belonging to Group I or II of the periodic table, a compound (C) having three or more polymerization reactive groups, and a compound (D) having two or more polymerization reactive groups that are polymerization reactive groups different from the polymerization reactive groups that the compound (C) has and are capable of causing a polymerization reaction with the polymerization reactive groups that the compound (C) has can be preferably used as a layer constituent material of an all-solid state secondary battery, and, furthermore, in a case in which, in this composition, a polymerization reaction between the compound (C) and the compound (D) is caused in the presence of the polymer (A) and the electrolyte salt (B) to form a layer constituting the all-solid state secondary battery, it is possible to impart high ion conductivity and excellent durability to the all-solid state secondary battery. The present invention was completed after further repeating studies on the basis of the above-described finding.

That is, the above-described objects are achieved by the following means.

<1> A solid electrolyte composition comprising: a polymer (A) having a mass average molecular weight of 5,000 or more; an electrolyte salt (B) having an ion of a metal belonging to Group I or II of the periodic table; a compound (C) having three or more polymerization reactive groups; and a compound (D) having two or more polymerization reactive groups that are polymerization reactive groups different from the polymerization reactive group that the compound (C) has and are capable of causing a polymerization reaction with the polymerization reactive group that the compound (C) has.

<2> The solid electrolyte composition according to <1>, in which the polymerization reactive group that the compound (C) has and the polymerization reactive group that the compound (D) has are respectively one polymerization reactive group selected from a group of polymerization reactive groups (a).

<Group of Polymerization Reactive Groups (a)>

A hydroxy group, an amino group, a carboxy group, an alkoxycarbonyl group, a haloformyl group, a sulfo group, a carbamoyl group, a formyl group, an isocyanate group, an oxetane group, an epoxy group, a dicarboxylic anhydride group, a silyl group, an alkynyl group, an alkenyl group, a bromo group, a chloro group, an iodine group, a diazo group, an azido group, a nitrile oxide group.

<3> The solid electrolyte composition according to <1> or <2>, in which a ratio $R^G$ of a polymerization reactive group prescribed by Expression ($R^G$) is more than 0.8 and less than 1.2.

Expression ($R^G$): $R^G$=[the number of the polymerization reactive groups in one molecule of the compound (C)×the content (mol) of the compound (C) in the solid electrolyte composition]/[the number of the polymerization reactive groups in one molecule of the compound (D)×the content (mol) of the compound (D) in the solid electrolyte composition]. <4> The solid electrolyte composition according to any one of <1> to <3>, in which a combination of the polymerization reactive group that the compound (C) has and the polymerization reactive group that the compound (D) has is any one of combinations (C1) to (C9) below.

<Combinations of Polymerization Reactive Groups>

(C1) an amino group and a carboxy group, (C2) an amino group and an isocyanate group, (C3) an amino group and an oxetane group, (C4) an amino group and an epoxy group, (C5) an amino group and a dicarboxylic anhydride group, (C6) an epoxy group and a carboxy group, (C7) an azido group and an alkynyl group, (C8) a nitrile oxide group and an alkynyl group, and (C9) a hydroxy group and an isocyanate group.

<5> The solid electrolyte composition according to any one of <1> to <4>, in which the combination of the polymerization reactive group that the compound (C) has and the polymerization reactive group that the compound (D) has is any one of combinations (C3), (C4), and (C6) to (C8) below.

<Combinations of Polymerization Reactive Groups>

(C3) an amino group and an oxetane group, (C4) an amino group and an epoxy group, (C6) an epoxy group and a carboxy group, (C7) an azido group and an alkynyl group, and (C8) a nitrile oxide group and an alkynyl group <6> The solid electrolyte composition according to any one of <1> to <5>, in which a mass ratio of contents of the polymer (A), the electrolyte salt (B), the compound (C), and the compound (D) in the solid electrolyte composition is 1:0.05 to 2.50:0.04 to 2:0.04 to 2 (the polymer (A): the electrolyte salt (B): the compound (C): the compound (D)).

<7> The solid electrolyte composition according to any one of <1> to <6>, in which the compound (D) has three or more of the polymerization reactive groups.

<8> The solid electrolyte composition according to any one of <1> to <7>, further comprising: an inorganic solid electrolyte (E).

<9> The solid electrolyte composition according to any one of <1> to <8>, further comprising: an active material (F).

<10> The solid electrolyte composition according to any one of <1> to <9>, further comprising: a solvent (G).

<11> The solid electrolyte composition according to <10>, in which a concentration of a solid content is 5% to 40% by mass.

<12> A solid electrolyte-containing sheet comprising: a layer constituted of the solid electrolyte composition according to any one of <1> to <11>.

<13> The solid electrolyte-containing sheet according to <12> comprising: the polymer (A), the electrolyte salt (B); and a reactant of the compound (C) and the compound (D).

<14> An all-solid state secondary battery comprising: a positive electrode active material layer; a negative electrode active material layer; and a solid electrolyte layer between the positive electrode active material layer and the negative electrode active material layer, in which at least one of the positive electrode active material layer, the negative electrode active material layer, or the solid electrolyte layer is a layer constituted of the solid electrolyte composition according to any one of <1> to <11>.

<15> The all-solid state secondary battery according to <14>, in which at least one of the positive electrode active material layer, the negative electrode active material layer, or the solid electrolyte layer contains an inorganic solid electrolyte.

<16> The all-solid state secondary battery according to <14> or <15>, in which the negative electrode active material layer is a lithium layer.

<17> A method for manufacturing a solid electrolyte-containing sheet, the method comprising: causing a polymerization reaction of the compound (C) and the compound (D) in the presence of the polymer (A) and the electrolyte salt (B) in the solid electrolyte composition according to any one of <1> to <11>.

<18> A method for manufacturing an all-solid state secondary battery, in which the all-solid state secondary battery is manufactured using the manufacturing method according to <17>.

In the description of the present invention, numerical ranges expressed using "to" include numerical values before and after the "to" as the lower limit value and the upper limit value.

The solid electrolyte composition and the solid electrolyte-containing sheet of the present invention are capable of imparting ion conductivity and durability on a high level to an all-solid state secondary battery by being used as a layer constituent material of the all-solid state secondary battery or a layer constituting the all-solid state secondary battery respectively. In addition, the all-solid state secondary battery of the present invention exhibits a high ion conductivity and excellent durability. Furthermore, the method for manufacturing the solid electrolyte-containing sheet and the method for manufacturing an all-solid state secondary battery of the present invention are capable of manufacturing a solid electrolyte-containing sheet and an all-solid state secondary battery which exhibit the above-described excellent characteristics.

The above-described and other characteristics and advantages of the present invention will be further clarified by the following description with appropriate reference to the accompanying drawings.

DESCRIPTION OF THE PREFERRED EMBODIMENTS

Figure 1:
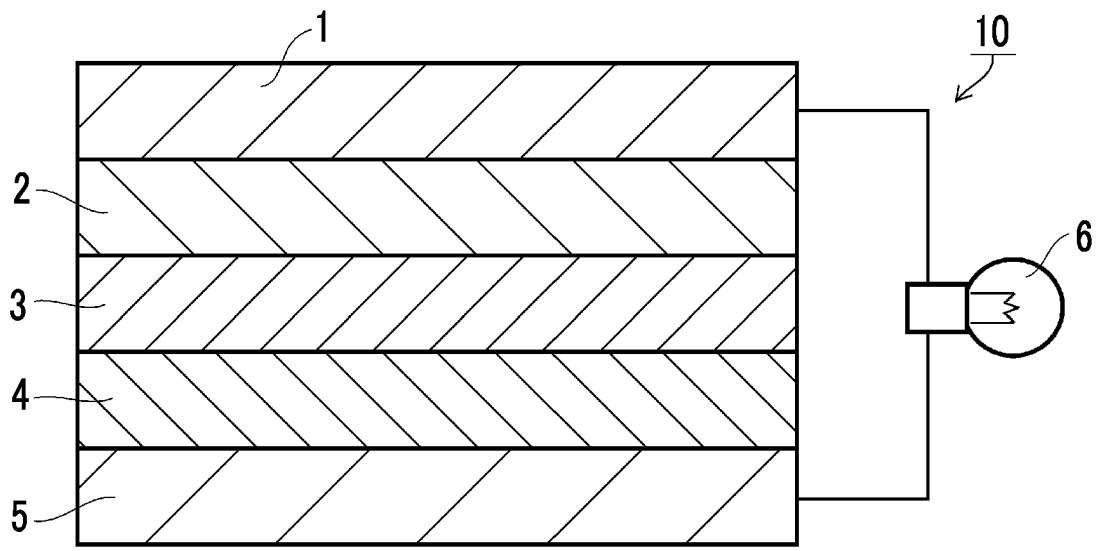
FIG. 1 is a vertical cross-sectional view schematically illustrating an all-solid state secondary battery according to a preferred embodiment of the present invention.

In the description of the present invention, an expression of a compound (for example, an expression of a substance with 'compound' as a suffix) is used to include not only the compound but also a salt thereof and an ion thereof. In addition, the expression is used to include a derivative which is the compound partially modified by the introduction of a substituent or the like as long as a desired effect is not impaired.

In the present invention, a substituent not clearly expressed to be substituted or unsubstituted (which is also true for a linking group or the like) indicates a substituent that may further have an appropriate substituent. This is also true for a compound not clearly expressed to be substituted or unsubstituted. As the substituent that the substituent may further have, a substituent T described below is preferably exemplified. The number of carbon atoms in the substituent further having an appropriate substituent refers to the total number of carbon atoms which include carbon atoms in the appropriate substituent.

In the present invention, in a case in which there is a plurality of substituents, linking groups, and the like (hereinafter, referred to as substituents and the like) indicated by a specific reference sign or a case in which a plurality of substituents and the like is simultaneously or selectively prescribed, the respective substituents and the like may be identical to or different from each other. In addition, unless particularly otherwise described, in a case in which a plurality of substituents and the like is adjacent to each other, the substituents and the like may be linked or fused to each other to form a ring.

In the present invention, a simple expression "acrylic" or "(meth)acrylic" indicates "acrylic and/or methacrylic". Similarly, a simple expression "acryloyl" or "(meth)acryloyl" indicates "acryloyl and/or methacryloyl", and a simple expression "acrylate" or "(meth)acrylate" indicates "acrylate and/or methacrylate".

In the present invention, a mass average molecular weight (Mw) is measured as a polyethylene glycol-equivalent molecular weight by means of gel permeation chromatography (GPC) unless particularly otherwise described. The mass average molecular weight is measured using a method under the following conditions. However, an appropriate eluent is appropriately selected and used depending on a polymer to be measured.

(Conditions)
Column: A column obtained by connecting TOSOH TSKgel Super HZM-H (trade name), TOSOH TSKgel Super HZ4000 (trade name), and TOSOH TSKgel Super HZ2000 (trade name) is used.
Carrier: N-methylpyrrolidone
Measurement temperature: 40° C.
Carrier flow rate: 1.0 mL/min
Specimen concentration: 0.1% by mass
Detector: Refractive index (RI) detector

[Solid Electrolyte Composition]

First, a solid electrolyte composition of an embodiment of the present invention will be described.

A solid electrolyte composition of an embodiment of the present invention contains a polymer (A) having a mass average molecular weight of 5,000 or more, an electrolyte salt (B) having an ion of a metal belonging to Group I or II of the periodic table, a compound (C) having three or more polymerization reactive groups, and a compound (D) having two or more polymerization reactive groups that are polymerization reactive groups different from the polymerization reactive group that the compound (C) has and are capable of causing a polymerization reaction with the polymerization reactive group that the compound (C) has.

In the present invention, the fact that the solid electrolyte composition contains the polymer (A) and the electrolyte salt (B) may be an aspect in which the solid electrolyte composition respectively contains the polymer (A) and the electrolyte salt (B) as a sole compound or an aspect in which the solid electrolyte composition contains an ion conductor formed by dissolving (dispersing) the electrolyte salt (B) in the polymer (A).

In addition, in the present invention, the fact that the solid electrolyte composition contains the compound (C) and the compound (D) may be not only an aspect in which the solid electrolyte composition contains the compound (C) and the compound (D) as a sole compound (in a state of not reacting with each other) but also an aspect in which the solid electrolyte composition contains a reactant formed by a polymerization reaction between the polymerization reactive group in the compound (C) and the polymerization reactive group in the compound (D). In this aspect of containing the reactant, the solid electrolyte composition that is not formed in a sheet shape is referred to as the solid electrolyte composition.

The solid electrolyte composition of the embodiment of the present invention serves as a material forming a solid electrolyte layer (polymer electrolyte).

The solid electrolyte composition of the embodiment of the present invention is capable of imparting a high ion conductivity and excellent durability to an all-solid state secondary battery by being used as the layer constituent material so that the compound (C) and the compound (D) polymerization-react with each other in the presence of the polymer (A) and the electrolyte salt (B), thereby forming a layer constituting the all-solid state secondary battery.

The detail of the reason therefor is not yet clear, but is considered as described below. That is, although the details of the polymerization reaction between the compound (C) and the compound (D), conditions therefor, and the like will be described below, in a case in which both compounds are caused to polymerization-react with each other in the co-presence of the polymer (A) and the electrolyte salt (B), the ion conductor made up of the polymer (A) and the electrolyte salt (B) and a matrix portion (matrix network) made of the polymerization reactant of both compounds can be formed in a state of being almost uniformly dispersed or mixed so as to exhibit an interaction. Furthermore, it is considered that this matrix portion forms a more uniform reaction portion (crosslinking structure) than a reaction portion that is formed by a reaction, for example, a chain reaction (polymerization) between the polymerization reactive groups that both compounds have. Therefore, the separation of the functions of an ion conductor and a matrix portion is realized, and it is possible to increase the mechanical strength of the reactant of the solid electrolyte composition (the film hardness of the solid electrolyte-containing sheet) without decreasing the ion conductivity of the ion conductor. Therefore, an all-solid state secondary battery of an embodiment of the present invention in which the solid electrolyte composition (solid electrolyte-containing sheet) of the embodiment of the present invention is used exhibits a high ion conductivity (low resistance), suppresses the occurrence of a voltage abnormal behavior or a short-circuit during charging and discharging, and exhibits excellent battery performance.

In the present invention, the crosslinking structure includes a bridged structure between polymers, a three-dimensional network structure, a branched structure, and the like.

<Polymer (A)>

The polymer (A) is a polymer that dissolves the electrolyte salt (B) to form an ion conductor. The polymer (A) is not particularly limited as long as the polymer has a characteristic of developing an ion conductivity together with the electrolyte salt (B), and polymers that are ordinarily used as a polymer electrolyte for an all-solid state secondary battery are exemplified. Here, the ion conductivity developed by the polymer (A) and the electrolyte salt (B) is a characteristic of conducting an ion of a metal belonging to Group I or II of the periodic table, and the ion conductivity is not particularly limited as long as the polymer exhibits an intended function as a polymer electrolyte.

The polymer (A) needs to be contained in the solid electrolyte composition, and the containment state is not particularly limited. For example, part or all of the polymer (A) may be contained singly, but is preferably contained as the ion conductor together with the electrolyte salt (B). The ion conductor is formed by dissolving (dispersing) the electrolyte salt (B) in the polymer (A). In the ion conductor, the electrolyte salt (B) is generally disassociated into a cation and an anion, but an undisassociated salt may be included.

The mass average molecular weight of the polymer (A) is 5,000 or more. In a case in which the solid electrolyte composition of the embodiment of the present invention contains the polymer (A) having a mass average molecular weight of 5,000 or more, it is possible to impart a high ion conductivity to all-solid state secondary batteries. The mass average molecular weight of the polymer (A) is preferably 20,000 or more, more preferably 50,000 or more, and still more preferably 80,000 or more from the viewpoint of ion conductivity. On the other hand, the mass average molecular weight is preferably 10,000,000 or less, more preferably 1,000,000 or less, and still more preferably 300,000 or less.

The mass average molecular weight of the polymer (A) is measured using the above-described measurement method.

The polymer (A) is preferably at least one selected from the group consisting of polyether, polysiloxane, polyester, polycarbonate, polyurethane, polyuria, or polyacrylate.

The polyether is preferably a polymer compound having a repeating unit represented by Formula (1-1).

(1-1)

$L^1$ represents a linking group and is preferably an alkylene group (preferably having 1 to 12 carbon atoms, more preferably having 1 to 6 carbon atoms, and particularly preferably having 1 to 4 carbon atoms), an alkenylene group (preferably having 2 to 12 carbon atoms, more preferably having 2 to 6 carbon atoms, and particularly preferably having 2 to 4 carbon atoms), an arylene group (preferably having 6 to 22 carbon atoms, more preferably having 6 to 14 carbon atoms, and particularly preferably having 6 to 10 carbon atoms), or a group formed of a combination thereof. The linking group may have the substituent T described below (preferably excluding the polymerization reactive groups that the compound (C) and the compound (D) have). Among them, an alkylene group having 1 to 4 carbon atoms is particularly preferred.

A plurality of $L^1$ in the molecule may be identical to or different from each other.

The molar ratio of the repeating unit represented by Formula (1-1) in the molecule is preferably 50% or more, more preferably 60% or more, and particularly preferably 70% or more. The upper limit is 100%. This molar ratio can be computed, for example, by an analysis using a nuclear magnetic resonance spectrum (NMR) or the like or the molar ratio of monomers used during synthesis. This will be also true below.

The polysiloxane is preferably a polymer compound having a repeating unit represented by Formula (1-2).

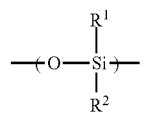
(1-2)

$R^1$ and $R^2$ represent a hydrogen atom, a hydroxy group, an alkyl group (preferably having 1 to 12 carbon atoms, more preferably having 1 to 6 carbon atoms, and particularly preferably having 1 to 3 carbon atoms), an alkenyl group (preferably having 2 to 12 carbon atoms, more preferably having 2 to 6 carbon atoms, and particularly preferably having 2 or 3 carbon atoms), an alkoxy group (preferably having 1 to 24 carbon atoms, more preferably having 1 to 12 carbon atoms, still more preferably 1 to 6 carbon atoms, and particularly preferably having 1 to 3 carbon atoms), an aryl group (preferably having 6 to 22 carbon atoms, more preferably having 6 to 14 carbon atoms, and particularly preferably having 6 to 10 carbon atoms), and an aralkyl group (preferably having 7 to 23 carbon atoms, more preferably having 7 to 15 carbon atoms, and particularly preferably having 7 to 11 carbon atoms). These alkyl group, alkenyl group, aryl group, and aralkyl group each may have the substituent T described below (preferably excluding the polymerization reactive groups that the compounds (C) and (D) have). Among them, an alkyl group having 1 to 3 carbon atoms, an alkoxy group having 1 to 12 carbon atoms, or a phenyl group is particularly preferred. $R^1$ and $R^2$ may be identical to or different from each other.

The molar ratio of the repeating unit represented by Formula (1-2) in the molecule is preferably 50% or more, more preferably 60% or more, and particularly preferably 70% or more. The upper limit is 100%.

The polyester is preferably a polymer compound having a repeating unit represented by Formula (1-3).

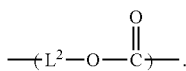
(1-3)

$L^2$ represents a linking group and is identical to $L^1$ in Formula (1-1).

The molar ratio of the repeating unit represented by Formula (1-3) in the molecule is preferably 50% or more, more preferably 60% or more, and particularly preferably 70% or more. The upper limit is 100%.

The polycarbonate, the polyurethane, and the polyuria each are a polymer compound having a repeating unit represented by Formula (1-4).

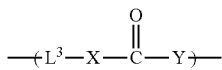
(1-4)

$L^3$ represents a linking group and is identical to $L^1$ in Formula (1-1).

X and Y each represent O or $NR^N$. $R^N$ is preferably a hydrogen atom, an alkyl group (preferably having 1 to 12 carbon atoms, more preferably having 1 to 6 carbon atoms, and particularly preferably having 1 to 3 carbon atoms), an alkenyl group (preferably having 2 to 12 carbon atoms, more preferably having 2 to 6 carbon atoms, and particularly preferably having 2 or 3 carbon atoms), an aryl group (preferably having 6 to 22 carbon atoms, more preferably having 6 to 14 carbon atoms, and particularly preferably having 6 to 10 carbon atoms), or an aralkyl group (preferably having 7 to 23 carbon atoms, more preferably having 7 to 15 carbon atoms, and particularly preferably having 7 to 11 carbon atoms). Among them, a hydrogen atom or an alkyl group having 1 or 2 carbon atoms is particularly preferred.

The molar ratio of the repeating unit represented by Formula (1-4) in the molecule is preferably 50% or more, more preferably 60% or more, and particularly preferably 70% or more. The upper limit is 100%.

The polyacrylate is preferably a compound having a repeating unit represented by Formula (1-5).

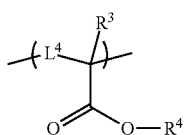
(1-5)

$L^4$ is a methylene group which may have a substituent (preferably an alkyl group having 1 to 3 carbon atoms, a phenyl group, a fluorine atom, or a chlorine atom).

$R^3$ represents a hydrogen atom, a halogen atom, methyl, ethyl, cyano, or hydroxyl and is particularly preferably a hydrogen atom or methyl.

$R^4$ represents a hydrogen atom, an alkyl group (preferably having 1 to 12 carbon atoms, more preferably having 1 to 6 carbon atoms, and particularly preferably having 1 to 3 carbon atoms), an alkenyl group (preferably having 2 to 12 carbon atoms, more preferably having 2 to 6 carbon atoms, and particularly preferably having 2 or 3 carbon atoms), an aryl group (preferably having 6 to 22 carbon atoms, more preferably having 6 to 14 carbon atoms, and particularly preferably having 6 to 10 carbon atoms), an aralkyl group (preferably having 7 to 23 carbon atoms, more preferably having 7 to 18 carbon atoms, and particularly preferably having 7 to 12 carbon atoms), a polyether group (polyethyleneoxy, polypropyleneoxy, polbutyleneoxide is preferred), or polycarbonate, and polyethyleneoxy (the terminal is a hydrogen atom or methyl) or polypropyleneoxy (the terminal is a hydrogen atom or methyl) is particularly preferred. These $R^4$'s each may have the substituent T (preferably excluding the polymerization reactive groups that the compounds (C) and (D) have).

A plurality of $L^4$, $R^3$, and $R^4$ in the molecule may be identical to or different from each other.

The molar ratio of the repeating unit represented by Formula (1-5) in the molecule is preferably 50% or more, more preferably 60% or more, and particularly preferably 70% or more. The upper limit is 100%.

The polymer compound having the repeating unit represented by any of Formulae (1-1) to (1-5) may contain other repeating units that are generally used in the respective polymer compounds.

The polymer (A) is preferably, among them, polyether such as polyethylene oxide (polyethylene glycol), polypropylene oxide (polypropylene glycol), or polytetramethylene ether glycol (polytetrahydrofuran), polysiloxane such as polydimethylsiloxane, polyacrylate such as polymethyl methacrylate or polyacrylic acid, or polycarbonate.

In the present invention, a polymer compound in which a carbon atom at an a site has a random substituent may be regarded as the polyacrylate, and, as the example of the substituent, for example, $R^3$ is exemplified.

As described above, the polyether such as polyethylene oxide has a low mechanical strength and thus, in the case of being used as the polymer in the polymer electrolyte, has room for improvement in the durability of all-solid state secondary batteries. However, in the present invention, the polyether is capable of building the ion conductor and the matrix portion which exhibit the above-described interaction, and thus, even in the case of using the polyether, it is possible to impart a high durability to all-solid state secondary batteries. Therefore, in the present invention, it is possible to preferably use polyether developing a high ion conductivity together with the electrolyte salt (B), particularly, polyethylene oxide as the polymer in the polymer electrolyte.

The polymer (A) preferably does not have a group capable of causing a polymerization reaction with the polymerization reactive groups that the compound (C) and the compound (D) have in the molecule (excluding the terminal of the molecular chain). The terminal group of the polymer (A) is not particularly limited, and appropriate groups (for example, a hydrogen atom, an alkyl group, and a hydroxy group) are exemplified.

The molecular shape of the polymer (A) (the shape of the molecular chain) is not particularly limited and may be linear or branched, but preferably does not have a three-dimensional network structure.

As the polymer (A), a polymer synthesized using an ordinary method may be used or a commercially available product may be used.

In the solid electrolyte composition, the polymer (A) may be contained singly or two or more polymers may be contained.

<Electrolyte Salt (B)>

The electrolyte salt (B) that is used in the present invention is a salt containing an ion of a metal belonging to Group I or II of the periodic table. This electrolyte salt (B) is a metal salt that disassociates (generates) an ion of a metal belonging to Group I or II of the periodic table as an ion that reciprocates between a positive electrode and a negative electrode by the charging and discharging of all-solid state secondary batteries. This electrolyte salt (B) exhibits a characteristic of developing an ion conductivity together with the polymer (A) by being dissolved in the polymer (A).

The electrolyte salt (B) needs to be contained in the solid electrolyte composition, and the containment state is not particularly limited. For example, part or all of the electrolyte salt (B) may be contained singly (in a disassociated state), but the electrolyte salt is preferably contained as the ion conductor together with the polymer (A). In addition, the electrolyte salt (B) may be partially disassociated in the solid electrolyte composition, but is preferably disassociated into a cation and an anion.

The electrolyte salt (B) is not particularly limited as long as the electrolyte salt exhibits the characteristic of developing ion conductivity, and an electrolyte salt that is generally used in polymer electrolytes for an all-solid state secondary battery can be exemplified.

Among them, a lithium salt is preferred, and a metallic salt (lithium salt) selected from (a-1) and (a-2) below is preferred.

(a-1): $LiA_xD_y$

A represents P, B, As, Sb, Cl, Br, or I or a combination of two or more elements selected from P, B, As, Sb, Cl, Br, and I. D represents F or O. x is an integer of 1 to 6 and more preferably an integer of 1 to 3. y is an integer of 1 to 12 and more preferably an integer of 4 to 6.

As preferred specific examples of the metal salt represented by $LiA_xD_y$, it is possible to exemplify an inorganic fluoride salt selected from $LiPF_6$, $LiBF_4$, $LiAsF_6$, and $LiSbF_6$ and a perhalite salt selected from $LiClO_4$, $LiBrO_4$, and $LiIO_4$.

(a-2): $LiN(R^fSO_2)_2$ $R^f$ represents a fluorine atom or a perfluoroalkyl group. The number of carbon atoms in the perfluoroalkyl group is preferably 1 to 4 and more preferably 1 or 2.

As preferred specific examples of the metal salt represented by $LiN(R^fSO_2)_2$, for example, it is possible to exemplify a perfluoroalkanesulfonmylimide salt selected from $LiN(CF_3SO_2)_2$, $LiN(CF_3CF_2SO_2)_2$, $LiN(FSO_2)_2$, and $LiN(CF_3SO_2)(C_4F_9SO_2)$.

Among them, from the viewpoint of ion conductivity, the electrolyte salt (B) is preferably a metal salt selected from $LiPF_6$, $LiBF_4$, $LiClO_4$, $LiBrO_4$, $LiN(CF_3SO_2)_2$, $LiN(FSO_2)_2$, and $LiN(CF_3SO_2)(C_4F_9SO_2)$, more preferably a metal salt selected from $LiPF_6$, $LiBF_4$, $LiClO_4$, $LiN(CF_3SO_2)_2$, and $LiN(FSO_2)_2$, and still more preferably a metal salt selected from $LiClO_4$, $LiN(CF_3SO_2)_2$, and $LiN(FSO_2)_2$.

As the electrolyte salt (B), an electrolyte salt synthesized using an ordinary method may be used or a commercially available product may be used.

In the solid electrolyte composition, the electrolyte salt (B) may be contained singly or two or more electrolyte salts may be contained.

<Compound (C) and Compound (D)>

The compound (C) and the compound (D) are compounds that polymerization-react with each other in, for example, a heating step described below to form a reactant that serves as the matrix portion and can be referred to as a precursor compound of the matrix portion.

In the present invention, the compound (C) has three or more of one kind of polymerization reactive group, and the compound (D) has two or more of one kind of polymerization reactive group.

The compound (D) is a polymerization reactive group different from the polymerization reactive group possessed by the compound (C) and has a polymerization reactive group capable of causing a reaction with the polymerization reactive group possessed by the compound (C). The chemical structure other than the polymerization reactive group (also referred to as a basic skeleton or a linking group) may be the same as or different from that of the compound (C). Therefore, in a case in which the solid electrolyte composition of the present invention contains a plurality of compounds corresponding to the compound (C) and the compound (D), one (one kind) of them is assigned to the compound (C), and the rest Is assigned to compound (D).

In the present invention, the expression "the polymerization reactive groups capable of causing a polymerization reaction with the polymerization reactive groups that the compound (C) has" indicates a polymerization reactive group exhibiting a characteristic of the polymerization reactive groups that do not react with the polymerization reactive groups that the compound (C) has under a preparation condition (mixing condition) of the solid electrolyte composition described below, but polymerization-react with the polymerization reactive groups under the heating condition described below. In addition, the expression "not reacting with the polymerization reactive groups" means not only that the reactive groups do not react with a polymerization reactive group but also that the reactive groups may partially (10% by mass or less) react with a polymerization reactive group as long as the film-forming property, handleability, or the like of the solid electrolyte composition is not impaired.

The polymerization reactive group that the compound (C) has and the polymerization reactive group that the compound (D) has have a characteristic of being capable of causing a polymerization reaction with each other, thereby causing a polymerization reaction with each other under a heating condition described below. Thereby, as a reactant of the compound (C) and the compound (D), a crosslinked polymer of a compound (C) component and a compound (D) component is obtained.

The polymerization reactive groups that the compound (C) and the compound (D) have need to be present in the molecular structure of each compound and may also be present in an inner portion or end portion of the molecular structure. From the viewpoint of reactivity, the reactive groups are preferably present in the end portion.

The polymerization reactive group that the compound (C) and the compound (D) each have is not particularly limited as long as the polymerization reactive group is the above-described polymerization reactive group. The polymerization reactive group is preferably one of polymerization reactive groups capable of causing a condensation reaction or an addition reaction and preferably a polymerization reactive group capable of causing an addition reaction since a by-product by the reaction is not generated.

The polymerization reactive groups that the compound (C) and the compound (D) respectively have are preferably one polymerization reactive group selected from a group of polymerization reactive groups (a) below.

<Group of Polymerization Reactive Groups (a)>

A hydroxy group, an amino group, a carboxy group, an alkoxycarbonyl group, a haloformyl group (—C(=)—X: X represents a halogen atom), a sulfo group, a carbamoyl group, a formyl group, an isocyanate group, an oxetane group, an epoxy group, a dicarboxylic anhydride group, a silyl group, an alkynyl group, an alkenyl group, a bromo group, a chloro group, an iodine group, a diazo group (=N$_2$, —N$^+$=N$^-$), an azido group (—N$_3$), a nitrile oxide group (—C≡N$^+$—O$^-$)

Here, the amino group is identical to an amino group as the substituent T described below and preferably an unsubstituted amino group. The alkoxycarbonyl group includes an aryloxycarbonyl group in addition to an alkoxycarbonyl group as the substituent T described below. The silyl group includes an alkylsilyl group, an arylsilyl group, an alkoxysilyl group, an aryloxysilyl group, and the like as the substituent T described below. The alkynyl group and the alkenyl group are respectively identical to an alkynyl group or an alkenyl group as the substituent T described below.

The polymerization reactive group is more preferably, among them, a hydroxy group, an amino group, a carboxy group, a haloformyl group, an isocyanate group, an oxetane group, an epoxy group, a dicarboxylic anhydride group, a silyl group, an alkynyl group, an alkenyl group, an azido group, or a nitrile oxide group and still more preferably an amino group, an oxetane group, an epoxy group, a carboxy group, an alkynyl group, an azido group, or a nitrile oxide group.

The polymerization reactive groups that the compound (C) and the compound (D) have may be appropriately protected by a protective group that is generally applied.

The combination of the polymerization reactive group that the compound (C) has and the polymerization reactive group that the compound (D) has is not particularly limited as long as the above-described reaction does not proceed under a mixing condition described below, but the above-described reaction proceeds in a heating step described below, and the combination of the polymerization reactive groups is determined in consideration of the series, the degree of a steric hindrance, and the like. As the combination of the polymerization reactive groups, for example, combinations CA to CC of a polymerization reactive group (I) and a polymerization reactive group (II) shown in Table 1 are preferred.

For the respective combinations CA to CC shown in Table 1, in a case in which a plurality of polymerization reactive groups is described in the polymerization reactive group (I) column or the polymerization reactive group (II) column, the combination of the polymerization reactive groups is a combination of one polymerization reactive group and one polymerization reactive group each randomly selected from the polymerization reactive groups described in the respective columns.

In the polymerization respective combinations CA to CC shown in Table 1, the polymerization reactive groups that the compound (C) has may be a group selected from any of the polymerization reactive group (I) and the polymerization reactive group (II) and is preferably a group selected from the polymerization reactive group (I). As the polymerization reactive group (I) and the polymerization reactive group (II) in the respective combinations shown in Table 1, underlined polymerization reactive groups are preferred.

TABLE 1

| No. | Polymerization reactive group (I) | Polymerization reactive group (II) |
|---|---|---|
| CA | Hydroxy group<br>Amino group | Isocyanate group<br>Dicarboxylic anhydride group<br>Haloformyl group<br>Silyl group |

TABLE 1-continued

| No. | Polymerization reactive group (I) | Polymerization reactive group (II) |
|---|---|---|
| CB | Azido group<br>Nitrile oxide group | Carboxy group<br>Oxetane group<br>Epoxy group<br>Alkenyl group<br>Alkynyl group |
| CC | Epoxy group<br>Oxetane group | Carboxy group<br>Dicarboxylic anhydride group<br>Haloformyl group |

The combination of the polymerization reactive groups is, among the above-described combinations, more preferably any of combinations (C1) to (C9) described below and still more preferably any of combinations (C3), (C4), and (C6) to (C8). The polymerization reactive groups that the compound (C) has are not particularly limited in the respective combinations (C1) to (C9) described below, but are preferably a polymerization reactive group described on the left side.

<Combinations of Polymerization Reactive Groups>

(C1) an amino group and a carboxy group, (C2) an amino group and an isocyanate group, (C3) an amino group and an oxetane group, (C4) an amino group and an epoxy group, (C5) an amino group and a dicarboxylic anhydride group, (C6) an epoxy group and a carboxy group, (C7) an azido group and an alkynyl group, (C8) a nitrile oxide group and an alkynyl group, and (C9) a hydroxy group and an isocyanate group.

The number of the polymerization reactive groups that the compound (C) has is not particularly limited as long as the number is three or more. As long as the compound (C) has three or more polymerization reactive groups, even in a case in which the compound (D) has only two polymerization reactive groups, it is possible to form a branched structure in the reactant of the compound (C) and the compound (D) and impart a high film hardness to solid electrolyte-containing sheets. The number of the polymerization reactive groups is preferably 3 to 100 and more preferably 3 to 6.

The number of the polymerization reactive groups that the compound (D) has is not particularly limited as long as the number is two or more and is preferably three or more. As long as the compound (D) has three or more polymerization reactive groups, it is possible to build not only a branched structure but also a three-dimensional network structure in the reactant of the compound (C) and the compound (D) and impart a higher film hardness to solid electrolyte-containing sheets. The number of the polymerization reactive groups is preferably 100 or less and more preferably 6 or less.

The basic skeleton of the compound (C) and the compound (D) having the above-described polymerization reactive groups is not particularly limited as long as the skeleton is capable of linking two or more polymerization reactive groups and can be appropriately selected.

The compound (C) and the compound (D) may be a low-molecular-weight compound or may be an oligomer or a polymer. In the case of a low-molecular-weight compound, the molecular weight is preferably 1,000 or less, more preferably 50 to 800, and still more preferably 100 to 300. In the case of an oligomer or a polymer, the molecular weight refers to the mass average molecular weight.

As the compound (C), a compound represented by Formula (b-12) is preferred.

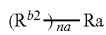
(b-12)

In the formula, $R^{b2}$ represents a polymerization reactive group and is preferably identical to the above-described polymerization reactive group capable of causing a condensation reaction or an addition reaction, and a preferred polymerization reactive group is also identical thereto.

na represents the number of polymerization reactive groups. na is not particularly limited as long as na is an integer of 3 or more, but is preferably an integer of 3 to 100 and more preferably 3 to 6.

Ra represents an na-valent linking group. The linking group that can be employed as Ra needs to have a valence of three or more, and, among linking groups formed of each linking group described below or a combination of these linking groups, an na-valent linking group is selected.

<Linking Group>

An alkane linking group (preferably having 1 to 30 carbon atoms, for example, an alkanetriyl group in the case of a trivalent alkane linking group), a cycloalkane linking group (preferably having 3 to 12 carbon atoms, for example, a cycloalkanetriyl group in the case of a trivalent alkane linking group), an aryl linking group (preferably having 6 to 24 carbon atoms, for example, an aryltriyl group in the case of a trivalent alkane linking group), a heteroaryl linking group (preferably having 3 to 12 carbon atoms, for example, a heteroaryltriyl group in the case of a trivalent alkane linking group), an oxy group (—O—), a sulfide group (—S—), a phosphinidene group (—PR—: R is a bondable site, a hydrogen atom or an alkyl group having 1 to 6 carbon atoms), a silylene group (—Si($R^{S1}$)($R^{S2}$)—: $R^{S1}$ and $R^{S2}$ are a bondable site, a hydrogen atom, or an alkyl group having 1 to 6 carbon atoms), a carbonyl group, an imino group (—$NR^{Nb}$—: $R^{Nb}$ is a bondable site, a hydrogen atom or an alkyl group having 1 to 6 carbon atoms, an aryl group having 6 to 10 carbon atoms).

A heteroaryl ring that forms the heteroaryl linking group includes at least one hetero atom (for example, a nitrogen atom, an oxygen atom, or a sulfur atom) as a ring-constituting atom and is preferably a five-membered ring, a six-membered ring, or a fused ring thereof.

A linking group that can be employed as Ra is, among them, preferably the alkane linking group, the aryl linking group, or a linking group formed of a combination of the alkane linking group, the aryl linking group, an oxy group, and a carbonyl group. In the case of the combination, two to five linking groups are preferably combined to each other, and two linking groups are more preferably combined to each other.

As the compound (D), a compound represented by Formula (b-12) is preferred.

Here, na in Formula (b-12) is an integer of 2 or more and not particularly limited, but is preferably an integer of 2 to 100 and more preferably 2 to 6.

In addition, Ra in Formula (b-12) needs to be a linking group having a valence of 2 or more and is preferably an alkane linking group having 1 to 30 carbon atoms (an alkylene group in the case of a divalent linking group), a cycloalkane linking group having 3 to 12 carbon atoms (a cycloalkylene group in the case of a divalent linking group), an aryl linking group having 6 to 24 carbon atoms (an arylene group in the case of a divalent linking group), a heteroaryl linking group having 3 to 12 carbon atoms (a heteroarylene group in the case of a divalent linking group), an oxy group, a sulfide group, the phosphinidene group, the silylene group, a carbonyl group, the imino group, or a combination thereof. Among these, an alkane linking group having 1 to 30 carbon atoms, an aryl linking group having 6 to 24 carbon atoms, an oxy group, a carbonyl group, or a combination thereof is preferred. In the case of the combination, two to five linking groups are preferably combined to each other, and two linking groups are more preferably combined to each other.

Hereinafter, specific examples of the compound (C) and the compound (D) will be illustrated; however, in the present invention, the compound (C) and the compound (D) are not limited thereto.

Among the specific examples illustrated below, compounds having three or more polymerization reactive groups are specific examples of the compound (C), and compounds having two or more polymerization reactive groups are specific examples of the compound (D). Therefore, trimethylolpropane is a specific example of the compound (C) and the compound (D), and ethylene glycol is a specific example of the compound (D).

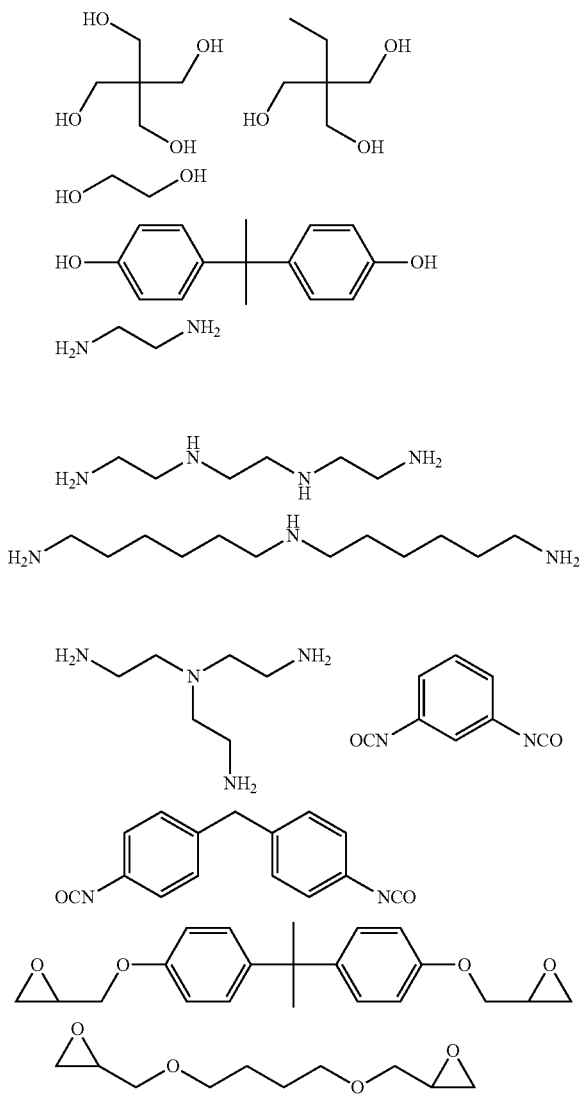

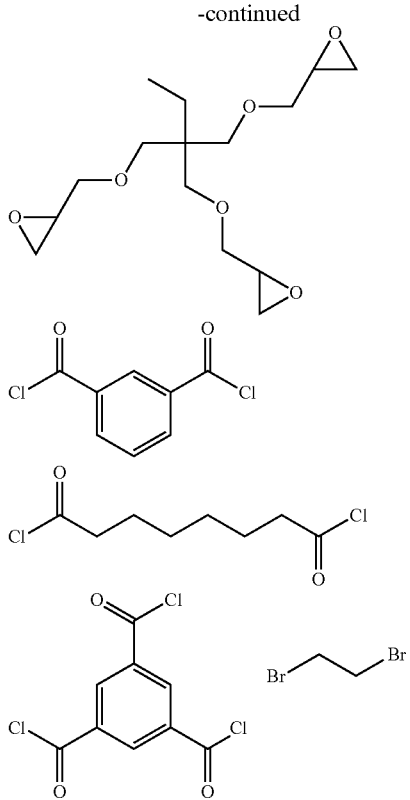

As the compound (C) and the compound (D), a compound synthesized using an ordinary method may be used or a commercially available product may be used.

As the substituent T, substituents described below are exemplified.

An alkyl group (preferably having 1 to 20 carbon atoms), an alkenyl group (preferably having 2 to 20 carbon atoms), an alkynyl group (preferably having 2 to 20 carbon atoms), a cycloalkyl group (preferably having 3 to 20 carbon atoms; however, in the case of mentioning an alkyl group in the present invention, generally, a cycloalkyl group is also included), an aryl group (preferably having 6 to 26 carbon atoms), an aralkyl group (preferably having 7 to 23 carbon atoms), a heterocyclic group (preferably a heterocyclic group having 2 to 20 carbon atoms, and preferably a 5- or 6-membered heterocyclic group having at least one oxygen atom, sulfur atom, or nitrogen atom), an alkoxy group (preferably having 1 to 20 carbon atoms), an aryloxy group (preferably having 6 to 26 carbon atoms; however, in the case of mentioning an alkoxy group in the present invention, generally, an aryloxy group is also included), an alkoxycarbonyl group (preferably having 2 to 20 carbon atoms), an aryloxycarbonyl group (preferably having 6 to 26 carbon atoms), an amino group (preferably an amino group having 0 to 20 carbon atoms, and an alkylamino group and an arylamino group are included), a sulfamoyl group (preferably having 0 to 20 carbon atoms), an acyl group (preferably having 1 to 20 carbon atoms), an aryloyl group (preferably having 7 to 23 carbon atoms; however, in the case of mentioning an acyl group in the present invention, generally, an aryloyl group is also included), an acyloxy group (preferably having 1 to 20 carbon atoms), an aryloyloxy group (preferably having 7 to 23 carbon atoms; however, in the case of mentioning an acyloxy group in the present invention, generally, an aryloyloxy group is also included), a carbamoyl group (preferably having 1 to 20 carbon atoms), an acylamino group (preferably having 1 to 20 carbon atoms), an alkylthio group (preferably having 1 to 20 carbon atoms), an arylthio group (preferably having 6 to 26 carbon atoms), an alkylsulfonyl group (preferably having 1 to 20 carbon atoms), an arylsulfonyl group (preferably having 6 to 22 carbon atoms), an alkylsilyl group (preferably having 1 to 20 carbon atoms), an arylsilyl group (preferably having 6 to 42 carbon atoms), an alkoxysilyl group (preferably having 1 to 20 carbon atoms), an aryloxysilyl group (preferably having 6 to 42 carbon atoms), a phosphoryl group (preferably a phosphoryl group having 0 to 20 carbon atoms, for example, —OP(=O)($R^P$)$_2$), a phosphonyl group (preferably a phosphonyl having 0 to 20 carbon atoms, for example, —P(=O)($R^P$)$_2$), a phosphinyl group (preferably a phosphinyl group having 0 to 20 carbon atoms, for example, —P($R^P$)$_2$), a (meta)acryloyl group, a (meth)acryloyloxy group, a (meth)acryloylimino group ((meth)acrylamide group), a hydroxy group, a sulfanyl group, a carboxy group, a phosphoric acid group, a phosphonic acid group, a sulfonic acid group, a cyano group, and a halogen atom (for example, a fluorine atom, a chlorine atom, a bromine atom, or an iodine atom) are exemplified. $R^P$ is a hydrogen atom, a hydroxyl group, or a substituent (preferably a group formed of the substituent T).

In addition, in the respective groups exemplified as the substituent T, the substituent T may be further substituted.

In a case in which a compound, a substituent, a linking group, or the like includes an alkyl group, an alkylene group, an alkenyl group, an alkenylene group, an alkynyl group, an alkynylene group, or the like, these groups may be cyclic or chain-like, may be linear or branched, and may be substituted as described above or unsubstituted.

—Reactant—

The reactant (crosslinked polymer) formed by the polymerization reaction between the compound (C) and the compound (D) is contained in the solid electrolyte-containing sheet of the embodiment of the present invention, but will be described here.

This reactant is a compound (a low-molecular-weight compound, an oligomer, or a polymer) formed by a reaction between the polymerization reactive groups that the respective compounds have through a condensation reaction or addition reaction described above. This reactant is generally a compound that does not exhibit a conductivity of an ion of a metal belonging to Group I or II of the periodic table. Here, the expression "not exhibiting an ion conductivity" also includes a case in which ion conductivity is developed as long as the ion conductivity is less than ion conductivity demanded for all-solid state secondary batteries (the ion conductivity is so small that the compound does not act as the ion conductor).

This reactant is preferably a polymer compound having a constituent component derived from the compound (C) (also referred to as the compound (C) component) and a constituent component derived from the compound (D) (also referred to as the compound (D) component) and can also be referred to as a crosslinked polymer of the compound (C) component and the compound (D) component. This reactant has a crosslinking structure (bond) formed by a reaction between the polymerization reactive group of the compound (C) and the polymerization reactive group of the compound (D). This crosslinking structure is determined by the combination of the polymerization reactive groups of the respective compounds. For example, examples of the crosslinking structures by the preferred combinations (C1) to (C9) of the above-described polymerization reactive groups are shown in Table 2, but the present invention is not limited thereto.

TABLE 2

| | Combination of polymerization reactive groups | Crosslinking structure |
|---|---|---|
| (C1) | Amino group and carboxy group | Amide bond |
| (C2) | Amino group and isocyanate group | Urea bond |
| (C3) | Amino group and oxetane group | 1,3-Amion alcohol structure |
| (C4) | Amino group and epoxy group | 1,2-Amion alcohol structure |
| (C5) | Amino group and dicarboxylic anhydride group | Imide bond |
| (C6) | Epoxy group and carboxy group | Ester bond |
| (C7) | Azido group and alkynyl group | Triazole group |
| (C8) | Nitrile oxide group and alkynyl group | Isoxazole group |
| (C9) | Hydroxy group and isocyanate group | Urethane bond |

As a resin having the above-described crosslinking structure, for example, an epoxy resin, an urethane resin, a polyester resin, an urea resin, a polyamide resin, a polyimide resin, polysiloxane, a polymer containing a triazole ring by a cycloaddition reaction (Huisgen cyclization reaction) between an azido group and an alkynyl group, a polymer containing an isoxazoline ring by a cycloaddition reaction between a nitrile oxide group and an alkynyl group, a polymer containing a 1-amino-3-hydroxyethylene structure (also referred to as a 1,3-aminoalcohol structure) by an addition reaction between an amino group and an epoxy group, a polymer containing a 1-amino-3-hydroxytrimethylene structure (1,3-aminoalcohol structure) by an addition reaction between an amino group and an oxetane group, and the like are exemplified.

The reactant has the above-described crosslinking structure depending on the numbers of the polymerization reactive groups that the compound (C) and the compound (D) respectively have or the like.

The condensation reaction and addition reaction each proceed at normal temperature or under heating, if necessary, in the presence of a catalyst or the like described below. The details will be described in the section of the manufacturing of a solid electrolyte-containing sheet described below.

The contents of the polymer (A), the electrolyte salt (B), the compound (C), and the compound (D) in the solid electrolyte composition are not particularly limited, but preferably satisfy the following contents.

The content of the polymer (A) is preferably 10% by mass or more, more preferably 30% by mass or more, and particularly preferably 50% by mass or more in the solid component of the solid electrolyte composition of the embodiment of the present invention. The upper limit is preferably 90% by mass or less, more preferably 80% by mass or less, and particularly preferably 70% by mass or less.

The content of the electrolyte salt (B) is preferably 5% by mass or more, more preferably 10% by mass or more, and particularly preferably 20% by mass or more in the solid component of the solid electrolyte composition of the embodiment of the present invention. The upper limit is preferably 60% by mass or less, more preferably 50% by mass or less, and particularly preferably 40% by mass or less.

The content of the compound (C) is preferably 0.5% by mass or more, more preferably 1% by mass or more, and particularly preferably 2% by mass or more in the solid component of the solid electrolyte composition of the embodiment of the present invention. The upper limit is preferably 40% by mass or less, more preferably 30% by mass or less, and particularly preferably 20% by mass or less.

The content of the compound (D) is preferably 0.5% by mass or more, more preferably 1% by mass or more, and particularly preferably 2% by mass or more in the solid component of the solid electrolyte composition of the embodiment of the present invention. The upper limit is preferably 40% by mass or less, more preferably 30% by mass or less, and particularly preferably 20% by mass or less.

The solid component (solid content) of the solid electrolyte composition of the embodiment of the present invention refers to a component that does not volatilize or evaporate and disappear in the case of being dried in a nitrogen atmosphere at 1 atmospheric pressure and 100° C. for six hours. Typically, the solid component indicates, among the components that the solid electrolyte composition of the embodiment of the present invention contains, components except for a solvent (G) described below.

In a case in which the solid electrolyte composition contains a plurality of specific components, the content of this component refers to the total content of the plurality of components.

In a case in which the solid electrolyte composition contains the reactants of the compound (C) and the compound (D), the compound (C) and the compound (D) forming this reactant is also included in the content.

Regarding the polymer (A), the electrolyte salt (B), the compound (C), and the compound (D), the contents of the polymer (A), the electrolyte salt (B), the compound (C), and the compound (D) in the solid electrolyte composition preferably satisfies a mass ratio of 1:0.05 to 2.50:0.04 to 2:0.04 to 2 (the polymer (A):the electrolyte salt (B):the compound (C):the compound (D)). In a case in which the mass ratio of the contents is satisfied, when a solid electrolyte-containing sheet has been manufactured, film hardness and ion conductivity can be developed on a higher level.

Particularly, the contents of the polymer (A) and the electrolyte salt (B) is preferably 1:0.05 to 2.50 and more preferably 1:0.3 to 1 (the polymer (A):the electrolyte salt (B)) in terms of the mass ratio.

In addition, the mass ratio of the content of the polymer (A) and the total content of the compound (C) and the compound (D) is preferably 1:0.08 to 4, more preferably 1:0.1 to 1.4, still more preferably 1:0.12 to 0.8, and particularly preferably 1:0.15 to 0.4.

In the solid electrolyte composition of the embodiment of the present invention, the compound (C) and the compound (D) preferably has a ratio $R^G$ of the polymerization reactive groups, which is prescribed by Expression ($R^G$), being more than 0.8 and less than 1.2 in addition to the above-described contents and, furthermore, the mass ratio. In a case in which the number of the polymerization reactive groups and the contents of the compound (C) and the compound (D) are set so as to satisfy the ratio $R^G$, the numbers of the polymerization reactive groups that the compound (C) and the compound (D) respectively have are close to each other, and the reaction between these polymerization reactive groups proceeds more uniformly. Therefore, the crosslinking structure of the reactant becomes more uniform, and it is possible to further increase film hardness without decreasing the ion conductivity of the solid electrolyte-containing sheet. The ratio $R^G$ of the polymerization reactive groups in the solid electrolyte composition is more preferably 0.9 to 1.1.

$R^G$=[The number of the polymerization reactive groups in one molecule of the compound (C)×the content of the compound (C) in the solid electrolyte composition]/[the number of the reactive groups in one molecule of the compound (D)×the content of the compound (D) in the solid electrolyte composition]   Expression ($R^G$):

In Expression ($R^G$), the contents of the compound (C) and the compound (D) in the solid electrolyte composition are mole-equivalent values.

In Expression ($R^G$), in a case in which the solid electrolyte composition contains a plurality of the compounds (D), [the number of the polymerization reactive groups in one molecule of the compound (D)×the content of the compound (D) in the solid electrolyte composition] is the total amount of the product of the numbers of the polymerization reactive groups in one molecule of the respective compounds (D) and the contents (mol) of the respective compounds (D).

The numbers of the polymerization reactive groups and the contents of the compound (C) and the compound (D) can be computed by an analysis using the nuclear magnetic resonance spectrum (NMR), liquid chromatography, gas chromatography, or the like of the solid electrolyte composition or from the amounts of the compounds used to prepare the solid electrolyte composition.

<Inorganic Solid Electrolyte (E)>

The solid electrolyte composition of the embodiment of the present invention may contain an inorganic solid electrolyte (E). In a case in which the solid electrolyte composition contains an inorganic solid electrolyte, it is possible to further improve the ion conductivity of the solid electrolyte-containing sheet that is obtained from the solid electrolyte composition and the all-solid state secondary battery including the above-described solid electrolyte-containing sheet.

The inorganic solid electrolyte is an inorganic solid electrolyte, and the solid electrolyte refers to a solid-form electrolyte capable of migrating ions therein. The inorganic solid electrolyte is clearly differentiated from an organic electrolyte salt represented by an organic solid electrolyte (the ion conductor for which polyethylene oxide (PEO) or the like is used and the like), lithium bis(trifluoromethanesulfonyl)imide (LiTFSI), or the like since the inorganic solid electrolyte does not include any organic substances as a principal ion-conductive material. In addition, the inorganic solid electrolyte is a solid in a static state and is thus, generally, not disassociated or liberated into cations and anions. Due to this fact, the inorganic solid electrolyte is also clearly differentiated from inorganic electrolyte salts of which cations and anions are disassociated or liberated in electrolytic solutions or polymers ($LiPF_6$, $LiBF_4$, LiFSI, LiCl, and the like). The inorganic solid electrolyte is not particularly limited as long as the inorganic solid electrolyte has a conductivity of an ion of a metal belonging to Group I or II of the periodic table and is generally a substance not having electron conductivity.

In the present invention, the inorganic solid electrolyte has a conductivity of an ion of a metal belonging to Group I or II of the periodic table. As the inorganic solid electrolyte, it is possible to appropriately select and use solid electrolyte materials that are applied to this kind of product. Typical examples of the inorganic solid electrolyte include (i) a sulfide-based inorganic solid electrolyte and (ii) an oxide-based inorganic solid electrolyte. In the present invention, the inorganic solid electrolyte is preferably a sulfide-based inorganic solid electrolyte from the viewpoint of ion conductivity, flexibility, and the like. In addition, in a case in which the solid electrolyte composition of the embodiment of the present invention contains an active material, the sulfide-based inorganic solid electrolyte is capable of forming a more favorable interface between the active material and the sulfide-based inorganic solid electrolyte, which is preferable.

(i) Sulfide-Based Inorganic Solid Electrolyte

The sulfide-based inorganic solid electrolyte is preferably a compound which contains sulfur atoms (S), has ion conductivity of a metal belonging to Group I or II of the periodic table, and has an electron-insulating property. The sulfide-based inorganic solid electrolyte is preferably an inorganic solid electrolyte which, as elements, contains at least Li, S, and P and has a lithium ion conductivity, but the sulfide-based inorganic solid electrolyte may also include elements other than Li, S, and P depending on the purposes or cases.

The solid electrolyte composition of the embodiment of the present invention preferably contains, as the sulfide-based inorganic solid electrolyte, a lithium ion-conductive inorganic solid electrolyte satisfying Formula (1) since the ion conductivity is more favorable.

$$L_{a1}M_{b1}P_{c1}S_{d1}A_{e1} \qquad \text{Formula (1)}$$

In the formula, L represents an element selected from Li, Na, and K and is preferably Li. M represents an element selected from B, Zn, Sn, Si, Cu, Ga, Sb, Al, and Ge. A represents an element selected from I, Br, Cl, and F. a1 to e1 represent the compositional ratios among the respective elements, and a1:b1:c1:d1:e1 satisfies 1 to 12:0 to 5:1:2 to 12:0 to 10. Furthermore, a1 is preferably 1 to 9 and more preferably 1.5 to 7.5. b1 is preferably 0 to 3 and more preferably 0 to 1. Furthermore, d1 is preferably 2.5 to 10 and more preferably 3.0 to 8.5. Furthermore, e1 is preferably 0 to 5 and more preferably 0 to 3.

The compositional ratios among the respective elements can be controlled by adjusting the amounts of raw material compounds blended to manufacture the sulfide-based inorganic solid electrolyte as described below.

The sulfide-based inorganic solid electrolytes may be non-crystalline (glass) or crystallized (made into glass ceramic) or may be only partially crystallized. For example, it is possible to use Li—P—S-based glass containing Li, P, and S or Li—P—S-based glass ceramic containing Li, P, and S.

The sulfide-based inorganic solid electrolytes can be manufactured by a reaction between at least two raw materials of, for example, lithium sulfide ($Li_2S$), phosphorus sulfide (for example, diphosphorus pentasulfide ($P_2S_5$)), a phosphorus single body, a sulfur single body, sodium sulfide, hydrogen sulfide, lithium halides (for example, LiI, LiBr, and LiCl), or sulfides of an element represented by M (for example, $SiS_2$, SnS, and $GeS_2$).

The ratio between $Li_2S$ and $P_2S_5$ in Li—P—S-based glass and Li—P—S-based glass ceramic is preferably 60:40 to 90:10 and more preferably 68:32 to 78:22 in terms of the molar ratio between $Li_2S:P_2S_5$. In a case in which the ratio between $Li_2S$ and $P_2S_5$ is set in the above-described range, it is possible to increase the lithium ion conductivity. Specifically, the lithium ion conductivity can be preferably set to $1\times10^{-4}$ S/cm or more and more preferably set to $1\times10^{-3}$ S/cm or more. The upper limit is not particularly limited, but realistically $1\times10^{-1}$ S/cm or less.

As specific examples of the sulfide-based inorganic solid electrolytes, combination examples of raw materials will be described below. Examples thereof include $Li_2S$—$P_2S_5$, $Li_2S$—$P_2S_5$—LiCl, $Li_2S$—$P_2S_5$—$H_2S$, $Li_2S$—$P_2S_5$—$H_2S$—LiCl, $Li_2S$—LiI—$P_2S_5$, $Li_2S$—LiI—$Li_2O$—$P_2S_5$, Li$_2$S—LiBr—P$_2$S$_5$, Li$_2$S—Li$_2$O—P$_2$S$_5$, Li$_2$S—Li$_3$PO$_4$—P$_2$S$_5$, Li$_2$S—P$_2$S$_5$—P$_2$O$_5$, Li$_2$S—P$_2$S$_5$—SiS$_2$, Li$_2$S—P$_2$S$_5$—SiS$_2$—LiCl, Li$_2$S—P$_2$S$_5$—SnS, Li$_2$S—P$_2$S$_5$—Al$_2$S$_3$, Li$_2$S—GeS$_2$, Li$_2$S—GeS$_2$—ZnS, Li$_2$S—Ga$_2$S$_3$, Li$_2$S—GeS$_2$—Ga$_2$S$_3$, Li$_2$S—GeS$_2$—P$_2$S$_5$, Li$_2$S—GeS$_2$—Sb$_2$S$_5$, Li$_2$S—GeS$_2$—Al$_2$S$_3$, Li$_2$S—SiS$_2$, Li$_2$S—Al$_2$S$_3$, Li$_2$S—SiS$_2$—Al$_2$S$_3$, Li$_2$S—SiS$_2$—P$_2$S$_5$, Li$_2$S—SiS$_2$—P$_2$S$_5$—LiI, Li$_2$S—SiS$_2$—LiI, Li$_2$S—SiS$_2$—Li$_4$SiO$_4$, Li$_2$S—SiS$_2$—Li$_3$PO$_4$, Li$_{10}$GeP$_2$S$_{12}$, and the like. Mixing ratios of the respective raw materials do not matter. Examples of a method for synthesizing sulfide-based inorganic solid electrolyte materials using the above-described raw material compositions include an amorphization method. Examples of the amorphization method include a mechanical milling method, a solution method, and a melting quenching method. This is because treatments at a normal temperature become possible, and it is possible to simplify manufacturing steps.

(ii) Oxide-Based Inorganic Solid Electrolyte

An oxide-based inorganic solid electrolyte is preferably a compound which contains oxygen atoms (O), has an ion conductivity of a metal belonging to Group I or II of the periodic table, and has an electron-insulating property.

Specific examples of the compounds include Li$_{xa}$La$_{ya}$TiO$_3$[xa=0.3 to 0.7 and ya=0.3 to 0.7] (LLT), Li$_{xb}$La$_{yb}$Zr$_{zb}$M$^{bb}{}_{mb}$O$_{nb}$ (M$^{bb}$ is at least one element of Al, Mg, Ca, Sr, V, Nb, Ta, Ti, Ge, In, or Sn, xb satisfies 5≤xb≤10, yb satisfies 1≤yb≤4, zb satisfies 1≤zb≤4, mb satisfies 0≤mb≤2, and nb satisfies 5≤nb≤20.), Li$_{xc}$B$_{yc}$M$^{cc}{}_{zc}$O$_{nb}$ (M$^{cc}$ is at least one element of C, S, Al, Si, Ga, Ge, In, or Sn, xc satisfies 0<xc≤5, yc satisfies 0<yc≤1, zc satisfies 0<zc≤1, and nc satisfies 0<nc≤6), Li$_{xd}$(Al, Ga)$_{yd}$(Ti, Ge)$_{zd}$Si$_{ad}$P$_{md}$O$_{nd}$ (1≤xd≤3, 0≤yd≤1, 0≤zd≤2, 0≤ad≤1, 1≤md≤7, 3≤nd≤13), Li$_{(3-2xe)}$M$^{ee}{}_{xe}$D$^{ee}$O (xe represents a number of 0 or more and 0.1 or less, and M$^{ee}$ represents a divalent metal atom. D$^{ee}$ represents a halogen atom or a combination of two or more halogen atoms.), Li$_{xf}$Si$_{yf}$O$_{zf}$ (1≤xf≤5, 0<yf≤3, 1≤zf≤10), Li$_{xg}$S$_{yg}$O$_{zg}$ (1≤xg≤3, 0<yg≤2, 1≤zg≤10), Li$_3$BO$_3$—Li$_2$SO$_4$, Li$_2$O—B$_2$O$_3$—P$_2$O$_5$, Li$_2$O—SiO$_2$, Li$_6$BaLa$_2$Ta$_2$O$_{12}$, Li$_3$PO$_{(4-3/2w)}$N$_w$ (w satisfies w<1), Li$_{3.5}$Zn$_{0.25}$GeO$_4$ having a lithium super ionic conductor (LISICON)-type crystal structure, La$_{0.55}$Li$_{0.35}$TiO$_3$ and Li$_{0.33}$La$_{0.55}$TiO$_3$ having a perovskite-type crystal structure, LiTi$_2$P$_3$O$_{12}$ having a natrium super ionic conductor (NASICON)-type crystal structure, Li$_{1+xh+yh}$(Al, Ga)$_{xh}$(Ti, Ge)$_{2-xh}$Si$_{yh}$P$_{3-yh}$O$_{12}$ (0≤xh≤1, 0≤yh≤1), Li$_7$La$_3$Zr$_2$O$_{12}$ (LLZ) having a garnet-type crystal structure. In addition, phosphorus compounds containing Li, P, and O are also desirable. Examples thereof include lithium phosphate (Li$_3$PO$_4$), LiPON in which some of oxygen atoms in lithium phosphate are substituted with nitrogen, LiPOD$^1$ (D$^1$ is at least one element selected from Ti, V, Cr, Mn, Fe, Co, Ni, Cu, Zr, Nb, Mo, Ru, Ag, Ta, W, Pt, Au, or the like), and the like. In addition, it is also possible to preferably use LiA$^1$ON (A$^1$ represents at least one element selected from Si, B, Ge, Al, C, Ga, or the like) and the like.

The volume-average particle diameter of the particulate inorganic solid electrolyte is not particularly limited, but is preferably 0.01 μm or more and more preferably 0.1 μm or more. The upper limit is preferably 100 μm or less and more preferably 50 μm or less.

In a case in which the solid electrolyte composition contains an inorganic solid electrolyte, the content of the inorganic solid electrolyte in the solid electrolyte composition is preferably 1% by mass or more, more preferably 5% by mass or more, and particularly preferably 10% by mass or more with respect to 100% by mass of the solid component in a case in which a decrease in the interface resistance and the maintenance of the decreased interface resistance in the case of being used in the all-solid state secondary battery are taken into account. From the same viewpoint, the upper limit is preferably 97% by mass or less, more preferably 70% by mass or less, and particularly preferably 30% by mass or less.

The inorganic solid electrolytes may be used singly or two or more inorganic solid electrolytes may be used.

<Active Material (F)>

The solid electrolyte composition of the embodiment of the present invention may contain an active material (F) capable of intercalating and deintercalating an ion of a metal belonging to Group I or II of the periodic table.

As the active material, it is possible to use a substance that is ordinarily used in all-solid state secondary batteries, and, for example, a positive electrode active material and a negative electrode active material are exemplified. A transition metal oxide that is a positive electrode active material or lithium titanate or graphite that is a negative electrode active material is preferred.

—Positive Electrode Active Material—

A positive electrode active material is preferably a positive electrode active material capable of reversibly intercalating and deintercalating lithium ions. The above-described material is not particularly limited as long as the material has the above-described characteristics, and transition metal oxides, organic substances, elements capable of being complexed with Li such as sulfur, complexes of sulfur and metal, and the like are exemplified.

Among these, as the positive electrode active material, transition metal oxides are preferred, and transition metal oxides having a transition metal element M$^a$ (one or more elements selected from Co, Ni, Fe, Mn, Cu, and V) are more preferred. In addition, an element M$^b$ (an element of Group I (Ia) of the metal periodic table other than lithium, an element of Group II (IIa), or an element such as Al, Ga, In, Ge, Sn, Pb, Sb, Bi, Si, P, or B) may be mixed into this transition metal oxide. The amount of the element mixed is preferably 0 to 30 mol % of the amount (100 mol %) of the transition metal element M$^a$. The positive electrode active material is more preferably synthesized by mixing the element into the transition metal oxide so that the molar ratio of Li/M$^a$ reaches 0.3 to 2.2.

Specific examples of the transition metal oxides include transition metal oxides having a bedded salt-type structure (MA), transition metal oxides having a spinel-type structure (MB), lithium-containing transition metal phosphoric acid compounds (MC), lithium-containing transition metal halogenated phosphoric acid compounds (MD), lithium-containing transition metal silicate compounds (ME), and the like. In the present invention, the transition metal oxides having a bedded salt-type structure (MA) and the lithium-containing transition metal phosphoric acid compounds (MC) are preferred.

Specific examples of the transition metal oxides having a bedded salt-type structure (MA) include LiCoO$_2$ (lithium cobalt oxide[LCO]), LiNiO$_2$ (lithium nickelate), LiNi$_{0.85}$Co$_{0.10}$Al$_{0.05}$O$_2$ (lithium nickel cobalt aluminum oxide[NCA]), LiNi$_{1/3}$Co$_{1/3}$Mn$_{1/3}$O$_2$ (lithium nickel manganese cobalt oxide[NMC]), and LiNi$_{0.5}$Mn$_{0.5}$O$_2$ (lithium manganese nickelate).

Specific examples of the transition metal oxides having a spinel-type structure (MB) include LiMn$_2$O$_4$ (LMO), LiCoMnO$_4$, Li$_2$FeMn$_3$O$_8$, Li$_2$CuMn$_3$O$_8$, Li$_2$CrMn$_3$O$_8$, and Li$_2$NiMn$_3$O$_8$.

Examples of the lithium-containing transition metal phosphoric acid compounds (MC) include olivine-type iron phosphate salts such as $LiFePO_4$ (lithium iron phosphate [LFP]) and $Li_3Fe_2(PO_4)_3$, iron pyrophosphates such as $LiFeP_2O_7$, and cobalt phosphates such as $LiCoPO_4$, and monoclinic nasicon-type vanadium phosphate salt such as $Li_3V_2(PO_4)_3$ (lithium vanadium phosphate).

Examples of the lithium-containing transition metal halogenated phosphoric acid compounds (MD) include iron fluorophosphates such as $Li_2FePO_4F$, manganese fluorophosphates such as $Li_2MnPO_4F$, cobalt fluorophosphates such as $Li_2CoPO_4F$.

Examples of the lithium-containing transition metal silicate compounds (ME) include $Li_2FeSiO_4$, $Li_2MnSiO_4$, $Li_2CoSiO_4$, and the like.

In the present invention, the lithium-containing transition metal phosphoric acid compounds (MC) is preferred, olivine-type iron phosphate is more preferred, and LFP is still more preferred.

The shape of the positive electrode active material is not particularly limited, but is preferably a particle shape. The volume-average particle diameter (circle-equivalent average particle diameter) of positive electrode active material particles is not particularly limited. For example, the volume-average particle diameter can be set to 0.1 to 50 µm.

The positive electrode active material may be used singly or two or more positive electrode active materials may be used.

In a case in which the solid electrolyte composition contains the positive electrode active material, the content of the positive electrode active material in the solid electrolyte composition is not particularly limited, but is preferably 10% to 95% by mass, more preferably 30% to 90% by mass, still more preferably 50% to 85% by mass, and particularly preferably 55% to 80% by mass with respect to a solid content of 100% by mass.

—Negative Electrode Active Material—

A negative electrode active material is preferably a negative electrode active material capable of reversibly intercalating and deintercalating lithium ions. The above-described material is not particularly limited as long as the material has the above-described characteristics, and examples thereof include carbonaceous materials, metal oxides such as tin oxide, silicon oxide, metal complex oxides, a lithium single body, lithium alloys such as lithium aluminum alloys, metals capable of forming alloys with lithium such as Sn, Si, Al, and In and the like. Among these, carbonaceous materials or metal complex oxides are preferably used in terms of reliability. In addition, the metal complex oxides are preferably capable of absorbing and deintercalating lithium. The materials are not particularly limited, but preferably contain titanium and/or lithium as constituent components from the viewpoint of high-current density charging and discharging characteristics.

The carbonaceous material that is used as the negative electrode active material is a material substantially consisting of carbon. Examples thereof include carbon black such as petroleum pitch, graphite (natural graphite, artificial graphite such as highly oriented pyrolytic graphite), and carbonaceous material obtained by firing a variety of synthetic resins such as polyacrylonitrile (PAN)-based resins or furfuryl alcohol resins. Furthermore, examples thereof also include a variety of carbon fibers such as PAN-based carbon fibers, cellulose-based carbon fibers, pitch-based carbon fibers, dehydrated polyvinyl alcohol (PVA)-based carbon fibers, lignin carbon fibers, glassy carbon fibers, and active carbon fibers, mesophase microspheres, graphite whisker, flat graphite, and the like.

The metal oxides and the metal complex oxides being applied as the negative electrode active material are particularly preferably amorphous oxides, and furthermore, chalcogenides which are reaction products between a metal element and an element belonging to Group XVI of the periodic table are also preferably used. The amorphous oxides mentioned herein refer to oxides having a broad scattering band having a peak of a 2θ value in a range of 20° to 40° in an X-ray diffraction method in which CuKα rays are used and may have crystalline diffraction lines.

In a compound group consisting of the amorphous oxides and the chalcogenides, amorphous oxides of semimetal elements and chalcogenides are more preferred, and elements belonging to Groups XIII (IIIB) to XV (VB) of the periodic table, oxides consisting of one element or a combination of two or more elements of Al, Ga, Si, Sn, Ge, Pb, Sb, and Bi, and chalcogenides are particularly preferred. Specific examples of preferred amorphous oxides and chalcogenides include $Ga_2O_3$, SiO, GeO, SnO, $SnO_2$, PbO, $PbO_2$, $Pb_2O_3$, $Pb_2O_4$, $Pb_3O_4$, $Sb_2O_3$, $Sb_2O_4$, $Sb_2O_8Bi_2O_3$, $Sb_2O_8Si_2O_3$, $Sb_2O_5$, $Bi_2O_3$, $Bi_2O_4$, $SnSiO_3$, GeS, SnS, $SnS_2$, PbS, $PbS_2$, $Sb_2S_3$, $Sb_2S_5$, and $SnSiS_3$. In addition, these amorphous oxides may be complex oxides with lithium oxide, for example, $Li_2SnO_2$.

The negative electrode active material may be used singly or two or more negative electrode active materials may be used.

In a case in which the solid electrolyte composition contains the negative electrode active material, the content of the negative electrode active material in the solid electrolyte composition is not particularly limited, but is preferably 10% to 80% by mass and more preferably 20% to 80% by mass with respect to 100% by mass of the solid content.

The surfaces of the positive electrode active material and the negative electrode active material may be coated with a separate metal oxide. Examples of the surface coating agent include metal oxides and the like containing Ti, Nb, Ta, W, Zr, Al, Si, or Li. Specific examples thereof include titanium oxide spinel, tantalum-based oxides, niobium-based oxides, lithium niobate-based compounds, and the like, and specific examples thereof include $Li_4Ti_5O_{12}$, $Li_2Ti_2O_5$, $LiTaO_3$, $LiNbO_3$, $LiAlO_2$, $Li_2ZrO_3$, $Li_2WO_4$, $Li_2TiO_3$, $Li_2B_4O_7$, $Li_3PO_4$, $Li_2MoO_4$, $Li_3BO_3$, $LiBO_2$, $Li_2CO_3$, $Li_2SiO_3$, $SiO_2$, $TiO_2$, $ZrO_2$, $Al_2O_3$, $B_2O_3$, and the like.

In addition, a surface treatment may be carried out on the surfaces of electrodes including the positive electrode active material or the negative electrode active material using sulfur, phosphorous, or the like.

Furthermore, the particle surfaces of the positive electrode active material or the negative electrode active material may be treated with an active light ray or an active gas (plasma or the like) before or after the coating of the surfaces.

<Solvent (G)>

The solid electrolyte composition of the embodiment of the present invention preferably contains a solvent (dispersion medium) capable of dissolving or dispersing the above-described components. The solvent (G) is not particularly limited as long as the solvent is ordinarily used in solid electrolyte compositions for an all-solid state secondary battery. Preferably, a solvent not having a group that reacts with any of the polymerization reactive groups that the compound (C) or the compound (D) has at the time of preparing or storing the solid electrolyte composition is selected.

As such a solvent, the following solvents can be exemplified.

As an alcohol compound solvent, for example, methyl alcohol, ethyl alcohol, 1-propyl alcohol, 2-propyl alcohol, 2-butanol, ethylene glycol, propylene glycol, 1,6-hexanediol, 2-methyl-2,4-pentanediol, 1,3-butanediol, and 1,4-butanediol are exemplified.

As an ether compound solvent, for example, alkylene glycols (triethylene glycol and the like), alkylene glycol monoalkyl ethers (ethylene glycol monomethyl ether and the like), alkylene glycol dialkyl ethers (ethylene glycol dimethyl ether and the like), dialkyl ethers (diisopropyl ether, dibutyl ether, and the like), cyclic ethers (tetrahydrofuran, dioxane (including each of 1,2-, 1,3-, and 1,4-isomers), and the like) are exemplified.

As an amide compound solvent, for example, N,N-dimethylformamide, 1-methyl-2-pyrrolidone, 2-pyrrolidinone, 1,3-dimethyl-2-imidazolidinone, ε-caprolactam, formamide, N-methylformamide, acetamide, N-methylacetamide, N,N-dimethylacetamide, N-methylpropanamide, and hexamethylphosphoric triamide are exemplified.

As an amino compound solvent, for example, triethylamine, diisopropylethylamine, and tributylamine are exemplified.

As a ketone compound solvent, for example, acetone, methyl ethyl ketone, methyl isobutyl ketone, cyclohexanone, and dibutyl ketone are exemplified.

As an aromatic compound solvent, for example, benzene, toluene, xylene, and mesitylene are exemplified.

As an aliphatic compound solvent, for example, hexane, heptane, cyclohexane, methylcyclohexane, octane, pentane, and cyclopentane are exemplified.

As a nitrile compound solvent, for example, acetonitrile, propionitrile, butyronitrile, and isobutyronitrile.

The boiling point at normal pressure (1 atmospheric pressure) of the solvent is preferably 50° C. or higher and more preferably 70° C. or higher. The upper limit is preferably lower than 250° C., more preferably 220° C. or lower, and still more preferably lower than 100° C. The solvent may be used singly or two or more solvents may be used.

In the present invention, an ether compound solvent, an amide compound solvent, a ketone compound solvent, or a nitrile compound solvent is preferred.

The concentration of the solid content of the solid electrolyte composition of the embodiment of the present invention is preferably 5% to 40% by mass, more preferably 8% to 30% by mass, and particularly preferably 10% to 20% by mass from the viewpoint of the film uniformity of an applied film of the solid electrolyte composition and the drying rate.

In the present invention, the solid content of the solid electrolyte composition is as described above. The concentration of the solid content generally refers to the percentage of a mass obtained by subtracting the mass of the solvent from the total mass of the solid electrolyte composition in the total mass of the solid electrolyte composition.

<Binder>

The solid electrolyte composition of the embodiment of the present invention may contain a binder. The binder may be contained in any form and may have a particle shape or an irregular shape in the solid electrolyte composition, the solid electrolyte-containing sheet, or the all-solid state secondary battery. The binder is preferably contained in a form of a particle (polymer particle) formed of a resin. The binder is more preferably contained in a form of a resin particle containing a macromonomer component.

In a case in which the binder that is used in the present invention is a resin particle, a resin that forms this resin particle is not particularly limited as long as the resin is an organic resin.

This binder is not particularly limited, but is preferably a form of, for example, a particle formed of the following resin.

Examples of a fluorine-containing resin include polytetrafluoroethylene (PTFE), polyvinylidene difluoride (PVdF), and copolymers of polyvinylidene difluoride and hexafluoropropylene (PVdF-HFP).

Examples of a hydrocarbon-based thermoplastic resin include polyethylene, polypropylene, styrene butadiene rubber (SBR), hydrogenated styrene butadiene rubber (HSBR), butylene rubber, acrylonitrile butadiene rubber, polybutadiene, polyisoprene, and the like.

Examples of an acrylic resin include a variety of (meth)acrylic monomers, (meth)acrylic amide monomers, and copolymers of monomers constituting these resins (preferably copolymers of acrylic acid and methyl acrylate).

In addition, a copolymer with other vinyl-based monomers is also preferably used. Examples thereof include a copolymer of methyl (meth)acrylate and styrene, a copolymer of methyl (meth)acrylate and acrylonitrile, and a copolymer of butyl (meth)acrylate, acrylonitrile, and styrene. In the present invention, a copolymer may be any of a statistic copolymer and a periodic copolymer and is preferably a blocked copolymer.

Examples of other resins include a polyurethane resin, a polyurea resin, a polyamide resin, a polyimide resin, a polyester resin, a polyether resin, a polycarbonate resin, a cellulose derivative resin, and the like.

Among these, a fluorine-containing resin, a hydrocarbon-based thermoplastic resin, an acrylic resin, a polyurethane resin, a polycarbonate resin, and a cellulose derivative resin are preferred, and an acrylic resin and a polyurethane resin are particularly preferred since the flexibility of the resin is favorable and, in a case in which the solid electrolyte composition contains an inorganic solid electrolyte, the affinity to the inorganic solid electrolyte is favorable.

As the binder, a binder synthesized or prepared using an ordinary method may be used or a commercially available product may be used.

The binder may be used singly or two or more binders may be used in combination.

In a case in which the solid electrolyte composition contains the binder, the content of the binder in the solid electrolyte composition is preferably 0.01% by mass or more, more preferably 0.1% by mass or more, and still more preferably 1% by mass or more with respect to 100% by mass of the solid component in a case in which a decrease in the interface resistance and the maintenance of the decreased interface resistance at the time of being used in all-solid state secondary batteries are taken into account. The upper limit is preferably 20% by mass or less, more preferably 10% by mass or less, and still more preferably 5% by mass or less from the viewpoint of battery characteristics.

In the present invention, the mass ratio of the content of the inorganic solid electrolyte (E) and the active material (F) to the content of the binder [(the content of the inorganic solid electrolyte (E)+the content of the active material (F))/the content of the binder] is preferably in a range of 1,000 to 1. This ratio is more preferably 500 to 2 and still more preferably 100 to 10.

<Conductive Auxiliary Agent>

The solid electrolyte composition of the embodiment of the present invention may also contain a conductive auxiliary agent. The conductive auxiliary agent is not particularly limited, and conductive auxiliary agents that are known as ordinary conductive auxiliary agents can be used. The conductive auxiliary agent may be, for example, graphite such as natural graphite or artificial graphite, carbon black such as acetylene black, Ketjen black, or furnace black, irregular carbon such as needle cokes, a carbon fiber such as a vapor-grown carbon fiber or a carbon nanotube, or a carbonaceous material such as graphene or fullerene which are electron-conductive materials and also may be metal powder or a metal fiber of copper, nickel, or the like, and a conductive polymer such as polyaniline, polypyrrole, polythiophene, polyacetylene, or a polyphenylene derivative may also be used. In addition, these conductive auxiliary agents may be used singly or two or more conductive auxiliary agents may be used.

In the present invention, in a case in which the active material and a conductive auxiliary agent are jointly used, among the above-described conductive auxiliary agents, a conductive auxiliary agent that does not intercalate and deintercalated an ion of a metal belonging to Group I or Group II of the periodic table and does not function as an active material at the time of charging and discharging a battery is regarded as the conductive auxiliary agent. Therefore, among the conductive auxiliary agents, a conductive auxiliary agent capable of functioning as the active material in the active material layer at the time of charging and discharging a battery is classified not into the conductive auxiliary agent but into the active material. Whether or not the conductive auxiliary agent functions as the active material at the time of charging and discharging a battery is not unambiguously determined but is determined by the combination with the active material.

(Ionic Liquid)

The solid electrolyte composition of the embodiment of the invention may contain an ionic liquid in order to further improve the ion conductivity of the respective layers constituting the solid electrolyte-containing sheet or the all-solid state secondary battery. The ionic liquid is not particularly limited, but is preferably an ionic liquid dissolving the above-described electrolyte salt (B), particularly, the lithium salt from the viewpoint of effectively improving the ion conductivity. Examples thereof include compounds made of a combination of a cation and an anion described below.

(i) Cation

The cation is not particularly limited, and an imidazolium cation, a pyridinium cation, a piperidinium cation, a pyrrolidinium cation, a morpholinium cation, a phosphonium cation, a quaternary ammonium cation, and the like are exemplified. Here, these cations have a substituent described below.

As the cation, these cations may be used singly or two or more cations can be used in combination.

A quaternary ammonium cation, a piperidinium cation, or a pyrrolidinium cation is preferred.

As the substituent that the cation has, an alkyl group (preferably having 1 to 8 carbon atoms and more preferably having 1 to 4 carbon atoms), a hydroxyalkyl group (preferably having 1 to 3 carbon atoms), an alkyloxyalkyl group (an alkyloxyalkyl group having 2 to 8 carbon atoms is preferred, and an alkyloxyalkyl group having 2 to 4 carbon atoms is more preferred), an ether group, an allyl group, an aminoalkyl group (an aminoalkyl group having 1 to 8 carbon atoms is preferred, and an aminoalkyl group having 1 to 4 carbon atoms is more preferred), and an aryl group (an aryl group having 6 to 12 carbon atoms is preferred, and an aryl group having 6 to 8 carbon atoms is more preferred) are exemplified. The substituent may form a cyclic structure in a form of containing a cation site. The substituent may further have a substituent selected from the substituent T. The ether group can be used in combination with other substituents. As such a substituent, an alkyloxy group, an aryloxy group, and the like are exemplified.

(ii) Anion

The anion is not particularly limited, and a chloride ion, a bromide ion, an iodide ion, a boron tetrafluoride ion, a nitric acid ion, a dicyanamide ion, an acetate ion, an iron tetrachloride ion, a bis(trifluoromethanesulfonyl)imide ion, a bis(fluorosulfonyl)imide ion, a bis(perfluorobutylmethanesulfonyl)imide ion, an allylsulfonate ion, a hexafluorophosphate ion, a trifluoromethanesulfonate ion, and the like are exemplified.

As the anion, these anions may be used singly or two or more anions may also be used in combination.

A boron tetrafluoride ion, a bis(trifluoromethanesulfonyl)imide ion, a bis(fluorosulfonyl)imide ion, a hexafluorophosphate ion, a dicyanamide ion, or an allylsulfonate ion is preferred, and a bis(trifluoromethanesulfonyl)imide ion, a bis(fluorosulfonyl)imide ion, or an allylsulfonate ion is more preferred.

As the ionic liquid, for example, 1-allyl-3-ethylimidazolium bromide, 1-ethyl-3-methylimidazolium bromide, 1-(2-hydroxyethyl)-3-methylimidazolium bromide, 1-(2-methoxyethyl)-3-methylimidazolium bromide, 1-octyl-3-methylimidazolium chloride, N,N-diethyl-N-methyl-N-(2-methoxyethyl)ammonium tetrafluoroborate, 1-ethyl-3-methylimidazolium bis(trifluoromethanesulfonyl)imide, 1-ethyl-3-methylimidazolium bis(fluorosulfonyl)imide, 1-ethyl-3-methylimidazolium dicyanamide, 1-butyl-1-methylpyrrolidinium bis(trifluoromethanesulfonyl)imide, trimethylbutylammonium bis(trifluoromethanesulfonyl)imide, N,N-diethyl-N-methyl-N-(2-methoxyethyl) ammonium bis (trifluoromethanesulfonyl)imide (DEME), N-propyl-N-methylpyrrolidinium bis(trifluoromethanesulfonyl)imide (PMP), N-(2-methoxyethyl)-N-methylpyrrolidinium tetrafluoroboride, 1-butyl-1-methylpyrrolidinium bis(fluorosulfonyl)imide, (2-acryloylethyl) trimethylammonium bis (trifluoromethanesulfonyl)imide, 1-ethyl-1-methylpyrrolidinium allyl sulfonate, 1-ethyl-3-methylimidazolium allylsulfonate, and trihexyltetradecylphosphonium chloride are exemplified.

The content of the ionic liquid is preferably 0 parts by mass or more, more preferably 1 part by mass or more, and most preferably 2 parts by mass or more with respect to 100 parts by mass of the ion conductor. The upper limit is preferably 50 parts by mass or less, more preferably 20 parts by mass or less, and particularly preferably 10 parts by mass or less.

The mass ratio between the electrolyte salt (B) and the ionic liquid (the electrolyte salt (B):the ionic liquid) is preferably 1:20 to 20:1, more preferably 1:10 to 10:1, and most preferably 1:7 to 2:1.

<Preparation of Solid Electrolyte Composition>

The solid electrolyte composition of the embodiment of the present invention can be prepared by mixing the respective components described above using, for example, a variety of mixers. Preferably, the solid electrolyte composition can be prepared as a solution in which the respective components described above are dissolved in a solvent or a slurry in which the respective components described above are dispersed in a solvent.

The mixing device that is used for the preparation of the solid electrolyte composition is not particularly limited, and, for example, a ball mill, a beads mill, a planetary mixer, a blade mixer, a roll mill, a kneader, and a disc mill are exemplified. The mixing condition is set to a condition in which the compound (C) and the compound (D) do not react with each other. The mixing temperature cannot be generally determined using the kinds, series, or the like of the polymerization reactive groups that the compound (C) and the compound (D) respectively have, but is, for example, preferably a temperature of 50° C. or lower and more preferably 30° C. or lower. In addition, the mixing environment is preferably a light-shielded environment if necessary. For example, in the case of using a ball mill, the respective components are preferably mixed together at the above-described mixing temperature in the above-described mixing environment at 150 to 700 rpm (rotation per minute) for one hour to 24 hours at the above-described mixing temperature and in the above-described mixing environment.

The respective components described above may be added to and mixed together at the same time or may be separately added to and mixed together.

In the case of being stored or the like after preparation, the solid electrolyte composition of the embodiment of the present invention is stored under a condition in which the compound (C) and the compound (D) do not polymerization-react with each other. The storage temperature is preferably a temperature of 50° C. or lower, more preferably a temperature of 30° C. or lower, and particularly preferably 0° C. or lower. In addition, the solid electrolyte composition is preferably stored in a light-shielded environment.

[Solid Electrolyte-Containing Sheet]

The solid electrolyte-containing sheet of the embodiment of the present invention has a layer constituted of the solid electrolyte composition of the embodiment of the present invention.

The solid electrolyte-containing sheet can be obtained by forming a film of the solid electrolyte composition of the embodiment of the present invention and is, specifically, the solid electrolyte composition of the embodiment of the present invention formed in a sheet shape by causing a polymerization reaction of the compound (C) and the compound (D) in the presence of the polymer (A) and the electrolyte salt (B). The solid electrolyte-containing sheet of the embodiment of the present invention contains a reactant among the polymer (A), the electrolyte salt (B), the compound (C), and the compound (D).

The solid electrolyte-containing sheet of the embodiment of the present invention containing the polymer (A) and the electrolyte salt (B) is identical to the solid electrolyte composition containing the polymer (A) and the electrolyte salt (B). In addition, the solid electrolyte-containing sheet containing the reactant between the compound (C) and the compound (D) includes not only an aspect in which a reactant formed by a reaction between the polymerization reactive group of the compound (C) and the polymerization reactive group of the compound (D) is contained but also an aspect in which an unreacted compound (C) or compound (D) is contained (left). The reactant of the compound (C) and the compound (D) is as described above. The solid electrolyte-containing sheet of the embodiment of the present invention contains the ion conductor and the reactant in an interacted state.

The solid electrolyte-containing sheet of the embodiment of the present invention is capable of imparting a high ion conductivity and excellent durability to all-solid state secondary batteries by being used as a negative electrode active material layer, a solid electrolyte layer, and/or a positive electrode active material layer. The detail of the reason therefor is as described above.

The solid electrolyte-containing sheet of the embodiment of the present invention may contain the above-described components or the like that the solid electrolyte composition preferably contains and preferably contains, for example, the inorganic solid electrolyte.

The contents of the respective components in the solid electrolyte-containing sheet of the embodiment of the present invention are identical to the contents in the solid content of the solid electrolyte composition. However, the content of the reactant of the compound (C) and the compound (D) is identical to the total content of the compound (C) and the compound (D) in the solid content of the solid electrolyte composition in a case in which the content of the reactant of the compound (C) and the compound (D) is regarded as the total content including the contents of the unreacted compound (C) and the unreacted compound (D).

The solid electrolyte-containing sheet (the layer constituted of the solid electrolyte composition) preferably contains no volatile component from the viewpoint of the battery performance of all-solid state secondary batteries, but may contain a volatile component as long as the content (residual amount) thereof is 0.5% by mass or more and less than 20% by mass of the total mass of the solid electrolyte-containing sheet. Here, the volatile component that the solid electrolyte-containing sheet may contain refers to a component that volatilizes in a vacuum (a pressure of 10 Pa or lower) environment at 250° C. for four hours, and, specifically, in addition to the solvent (G), the unreacted compound (C) and the unreacted compound (D) can also be exemplified as long as the component volatilizes under the above-described conditions. The content of the volatile component is preferably 0% to 10% by mass and more preferably 0.5% to 5% by mass of the total mass of the solid electrolyte-containing sheet.

The content of the volatile component is measured using a method under conditions which will be described in the section of examples described below.

In a case in which the solid electrolyte-containing sheet contains the solvent (G), the content of the solvent needs to be in the range of the content of the above-described volatile component and is, for example, preferably in a range of 1 to 10,000 ppm of the total mass of the solid electrolyte-containing sheet.

The content proportion of the solvent (G) in the solid electrolyte-containing sheet of the embodiment of the present invention is identical to a method for measuring the volatile component.

The layer thickness of the solid electrolyte-containing sheet of the embodiment of the present invention is identical to the layer thickness of the solid electrolyte layer to be described in the section of the all-solid state secondary battery of the embodiment of the present invention and is particularly preferably 20 to 150 μm.

The solid electrolyte-containing sheet of the embodiment of the present invention is preferred as a negative electrode active material layer, a solid electrolyte layer, and/or a positive electrode active material layer of all-solid state secondary batteries.

The solid electrolyte-containing sheet of the embodiment of the present invention is preferably produced by forming a film of (applying and drying) the solid electrolyte composition of the embodiment of the present invention on a base material (possibly, through a different layer) as necessary to cause the compound (C) and the compound (D) to polymerization-react with each other in the presence of the polymer (A) and the electrolyte salt (B). The detail will be described below.

The solid electrolyte-containing sheet of the embodiment of the invention includes a variety of aspects depending on the uses. Examples thereof include a sheet that is preferably used in a solid electrolyte layer (also referred to as a solid electrolyte sheet for an all-solid state secondary battery), a sheet that is preferably used in an electrode or a laminate of an electrode and a solid electrolyte layer (an electrode sheet for an all-solid state secondary battery), and the like. In the present invention, a variety of sheets described above will be collectively referred to as a sheet for an all-solid state secondary battery in some cases.

The sheet for an all-solid state secondary battery is a sheet having a solid electrolyte layer or an active material layer, and, for example, an aspect of a sheet having a solid electrolyte layer or an active material layer on a base material is exemplified. The sheet for an all-solid state secondary battery may not have the base material. This sheet for an all-solid state secondary battery may have other layers as long as the sheet has a solid electrolyte layer or an active material layer, but a sheet containing an active material is classified into an electrode sheet for an all-solid state secondary battery described below. As the other layers, for example, a protective layer, a collector, and the like are exemplified.

As the solid electrolyte sheet for an all-solid state secondary battery, for example, a sheet having a solid electrolyte layer and a protective layer in this order on a base material and a sheet having a solid electrolyte layer and a protective layer are exemplified.

The base material is not particularly limited as long as the base material is capable of supporting the solid electrolyte layer and/or the active material layer, and examples thereof include sheet bodies (plate-like bodies) of materials, organic materials, inorganic materials, and the like described in the section of the collector described below. Examples of the organic materials include a variety of polymers and the like, and specific examples thereof include polyethylene terephthalate, surface-treated (hydrophobilized) polyethylene terephthalate, polytetrafluoroethylene, polypropylene, polyethylene, cellulose, and the like. Examples of the inorganic materials include glass, ceramic, and the like.

The layer thickness of the solid electrolyte layer in the solid electrolyte sheet for an all-solid state secondary battery is identical to the layer thickness of the solid electrolyte layer to be described in the section of the all-solid state secondary battery of the embodiment of the present invention.

An electrode sheet for an all-solid state secondary battery (also simply referred to as "the electrode sheet") is an electrode sheet having an active material layer on a metal foil as a collector. This electrode sheet may be an aspect of having a collector, an active material layer, and a solid electrolyte layer in this order and an aspect of having a collector, an active material layer, a solid electrolyte layer, and an active material layer in this order are also considered as the electrode sheet. In the electrode sheet, the active material layer or the solid electrolyte layer can be formed using the solid electrolyte composition of the embodiment of the present invention.

The constitutions and the layer thicknesses of the respective layers constituting the electrode sheet are identical to the constitutions and the layer thicknesses of individual layers to be described in the section of the all-solid state secondary battery of the embodiment of the present invention described below.

[All-Solid State Secondary Battery]

An all-solid state secondary battery of the embodiment of the present invention has a positive electrode active material layer, a negative electrode active material layer, and a solid electrolyte layer between the positive electrode active material layer and the negative electrode active material layer. In this all-solid state secondary battery, at least one layer of the positive electrode active material layer, the negative electrode active material layer, or the solid electrolyte layer and preferably all layers are a layer formed of the solid electrolyte composition of the embodiment of the present invention described below (the solid electrolyte-containing sheet of the embodiment of the present invention).

The positive electrode active material layer and the negative electrode active material layer each constitute a positive electrode or a negative electrode of the all-solid state secondary battery singly or preferably together with a collector. Therefore, the all-solid state secondary battery of the embodiment of the present invention can be referred to as a battery having a positive electrode, a negative electrode opposite to the positive electrode, and a solid electrolyte layer between the positive electrode and the negative electrode.

Hereinafter, a preferred embodiment of the present invention will be described with reference to FIG. 1, but the present invention is not limited thereto.

FIG. 1 is a cross-sectional view schematically illustrating an all-solid state secondary battery (lithium ion secondary battery) according to a preferred embodiment of the present invention. In the case of being seen from the negative electrode side, an all-solid state secondary battery 10 of the present embodiment has a negative electrode collector 1, a negative electrode active material layer 2, a solid electrolyte layer 3, a positive electrode active material layer 4, and a positive electrode collector 5 in this order. The respective layers are in contact with each other and form a laminated structure. In the case of employing the above-described structure, during charging, electrons (e) are supplied to the negative electrode side, and lithium ions ($Li^+$) are accumulated on the negative electrode side. On the other hand, during discharging, the lithium ions ($Li^+$) accumulated on the negative electrode side return to the positive electrode, and electrons are supplied to an operation portion 6. In the example illustrated in the drawing, an electric bulb is employed as the operation portion 6 and is lit by discharging.

In a case in which the all-solid state secondary battery 10 having a layer constitution shown in FIG. 1 is put into a 2032-type coin case, the all-solid state secondary battery 10 will be referred to as the all-solid state secondary battery sheet, and a battery produced by putting this all-solid state secondary battery sheet into a 2032-type coin case will be referred to as the all-solid state secondary battery, thereby referring to both batteries separately in some cases.

<Positive Electrode Active Material Layer, Solid Electrolyte Layer, and Negative Electrode Active Material Layer>

In the all-solid state secondary battery 10, at least one layer of the negative electrode active material layer 2, the solid electrolyte layer 3, or the positive electrode active material layer 4 is formed of the solid electrolyte-containing sheet of the embodiment of the present invention. In addition, at least one layer (preferably all layers) of the negative electrode active material layer 2, the solid electrolyte layer 3, or the positive electrode active material layer 4 preferably contain an inorganic solid electrolyte. A layer containing the inorganic solid electrolyte can be formed using, for example, a solid electrolyte composition containing the inorganic solid electrolyte.

Among the negative electrode active material layer 2, the solid electrolyte layer 3, or the positive electrode active material layer 4, a layer other than the layer formed using the solid electrolyte composition of the embodiment of the present invention can be formed using an ordinarily-used solid electrolyte composition. As the ordinary solid electrolyte composition, for example, a solid electrolyte composition containing, among the above-described components, a component other than the components (A) to (D) is exemplified. The solid electrolyte layer 3 generally does not include a positive electrode active material and/or a negative electrode active material.

In the active material layer and/or the solid electrolyte layer formed using the solid electrolyte composition of the embodiment of the present invention, the respective components contained and the contents thereof are preferably identical to the respective components and the contents thereof in the solid electrolyte-containing sheet unless particularly otherwise described.

In the present invention, the positive electrode active material layer and the negative electrode active material layer will be collectively referred to as the active material layer in some cases.

One of preferred aspects is that the negative electrode active material layer is a lithium layer from the viewpoint of the energy density. In this case, at least one layer of the solid electrolyte layer or the positive electrode active material layer is formed of the solid electrolyte-containing sheet of the embodiment of the present invention. In the present invention, the lithium layer includes a layer formed by depositing or shaping lithium powder, a lithium foil, and a lithium-deposited film.

The thicknesses of the negative electrode active material layer 2, the solid electrolyte layer 3, and the positive electrode active material layer 4 are respectively not particularly limited. In a case in which the dimensions of an ordinary all-solid state secondary battery are taken into account, regarding the thicknesses of the respective layers, the lower limit is preferably 3 µm or more and more preferably 10 µm or more. The upper limit is preferably 1,000 µm or less, more preferably less than 500 µm, and particularly preferably 150 µm or less. In the all-solid state secondary battery of the embodiment of the present invention, the thickness of at least one layer of the negative electrode active material layer, the solid electrolyte layer, or the positive electrode active material layer is preferably 50 µm or more and less than 500 µm.

<Collector (Metal Foil)>

The positive electrode collector 5 and the negative electrode collector 1 are preferably an electron conductor.

In the present invention, there are cases in which either or both of the positive electrode collector and the negative electrode collector will be simply referred to as the collector.

As a material forming the positive electrode collector, aluminum, an aluminum alloy, stainless steel, nickel, titanium, and the like, and furthermore, a material obtained by treating the surface of aluminum or stainless steel with carbon, nickel, titanium, or silver (a material forming a thin film) is preferred, and, among these, aluminum, stainless steel, and an aluminum alloy are more preferred.

As a material forming the negative electrode collector, aluminum, copper, a copper alloy, stainless steel, nickel, titanium, and the like, and furthermore, a material obtained by treating the surface of aluminum, copper, a copper alloy, or stainless steel with carbon, nickel, titanium, or silver is preferred, and aluminum, copper, a copper alloy, or stainless steel is more preferred.

Regarding the shape of the collector, generally, collectors having a film sheet-like shape are used, but it is also possible to use net-shaped collectors, punched collectors, compacts of lath bodies, porous bodies, foaming bodies, or fiber groups, and the like.

The thickness of the collector is not particularly limited, but is preferably 1 to 500 µm. In addition, the surface of the collector is preferably provided with protrusions and recesses by means of a surface treatment.

In the present invention, a functional layer, member, or the like may be appropriately interposed or disposed between the respective layers of the negative electrode collector, the negative electrode active material layer, the solid electrolyte layer, the positive electrode active material layer, and the positive electrode collector or on the outside thereof. In addition, the respective layers may be composed of a single layer or multiple layers.

<Chassis>

It is possible to produce the basic structure of the all-solid state secondary battery by disposing the respective layers described above. Depending on the use, the basic structure may be directly used as an all-solid state secondary battery, but the basic structure may be used after being enclosed in an appropriate chassis in order to have a dry battery form. The chassis may be a metallic chassis or a resin (plastic) chassis. In a case in which a metallic chassis is used, examples thereof include an aluminum alloy chassis and a stainless-steel chassis. The metallic chassis is preferably classified into a positive electrode-side chassis and a negative electrode-side chassis and electrically connected to the positive electrode collector and the negative electrode collector respectively. The positive electrode-side chassis and the negative electrode-side chassis are preferably integrated by being joined together through a gasket for short circuit prevention.

[Manufacturing of Solid Electrolyte-Containing Sheet]

The solid electrolyte-containing sheet of the embodiment of the present invention is obtained by applying and drying or heating (forming a film of) the solid electrolyte composition of the embodiment of the present invention on a base material (possibly, through a different layer) or a metal foil as necessary (heating step). Heating the solid electrolyte-containing sheet of the embodiment of the present invention (heating condition) means the fact (condition) that the solid electrolyte composition is heated to a temperature at which the compound (C) and the compound (D) polymerization-react with each other. For example, heating the solid electrolyte composition applied at a temperature at which the compound (C) and the compound (D) do not polymerization-react to a temperature higher than the temperature at which the compound does not polymerization-react, for example, a temperature equal to or higher than a temperature at which the compound (B) polymerization-reacts is regarded as the above-described heating. In the case of (applying and) heating the solid electrolyte composition as described above, it is possible to cause the compound (C) and the compound (D) to polymerization-react with each other in the presence of the polymer (A) and the electrolyte salt (C). Therefore, it is possible to form a solid electrolyte layer or an active material layer shaped in a sheet layer (lamellar shape).

The expression "in the presence of the polymer (A) and the electrolyte salt (B)" includes not only an aspect in which the polymer (A) and the electrolyte salt (B) each are present as a sole compound but also an aspect in which the polymer and the electrolyte salt are present as the ion conductor formed by dissolving (dispersing) the electrolyte salt (B) in the polymer (A).

A condition for causing the compound (C) and the compound (D) to polymerization-react with each other cannot be generally determined by the kinds of the polymerization reactive groups that the compound (C) and the compound (D) respectively had, the kind of the reaction, and the like, and the polymerization reaction proceeds even at room temperature (25° C.). As an example of the reaction condition, the reaction temperature is, for example, 60° C. or higher, preferably 70° C. to 150° C., and more preferably 80° C. to 120° C. The reaction time and the reaction environment are appropriately set. In addition, it is possible to use a variety of catalysts that are ordinarily used for the reaction between the polymerization reactive groups, and it is also possible to radiate light as necessary.

Regarding steps such as the application of the solid electrolyte composition, it is possible to use a method to be described in the following section of the manufacturing of an all-solid state secondary battery.

In the case of a solid electrolyte sheet for an all-solid state secondary battery, it is also possible to peel the base material on which a film of the solid electrolyte composition has been formed, if necessary, and product a sheet formed of the solid electrolyte layer.

[Manufacturing of all-Solid State Secondary Battery]
<Method for Manufacturing all-Solid State Secondary Battery>

The manufacturing of the all-solid state secondary battery can be carried out using an ordinary method except for the fact that the method for manufacturing the solid electrolyte-containing sheet of the embodiment of the present invention is carried out. Specifically, the all-solid state secondary battery can be manufactured by forming layers made of the solid electrolyte-containing sheet using the solid electrolyte composition of the embodiment of the present invention or the like. Hereinafter, the manufacturing method will be described in detail.

The all-solid state secondary battery of the embodiment of the present invention can be manufactured using a method including (through) a step of applying the solid electrolyte composition of the embodiment of the present invention onto a metal foil that serves as a collector and forming a coated film.

In a method for producing the all-solid state secondary battery of the embodiment of the present invention, the compound (C) and the compound (D) polymerization-react with each other as described above in a step of heating the solid electrolyte composition of the embodiment of the present invention, which will not be described again in the following description. In addition, in the following description, the composition is applied and heated; however, in the present invention, a step that is at least required is the heating of the composition.

For example, a solid electrolyte composition containing a positive electrode active material is applied and heated as a material for a positive electrode (a composition for a positive electrode) onto a metal foil which is a positive electrode collector so as to form a positive electrode active material layer, thereby producing a positive electrode sheet for an all-solid state secondary battery. Next, a solid electrolyte composition for forming a solid electrolyte layer is applied and heated onto the positive electrode active material layer so as to form a solid electrolyte layer. Furthermore, a solid electrolyte composition containing a negative electrode active material is applied and heated as a material for a negative electrode (a composition for a negative electrode) onto the solid electrolyte layer so as to form a negative electrode active material layer. A negative electrode collector (a metal foil) is overlaid on the negative electrode active material layer, whereby it is possible to obtain an all-solid state secondary battery having a structure in which the solid electrolyte layer is sandwiched between the positive electrode active material layer and the negative electrode active material layer. A desired all-solid state secondary battery can be produced by enclosing the all-solid state secondary battery in a chassis as necessary.

In this manufacturing method, the solid electrolyte composition of the embodiment of the present invention is used for at least one solid electrolyte composition of a material for the positive electrode, a solid electrolyte composition for forming the solid electrolyte layer, or a material for the negative electrode, and the above-described solid electrolyte composition or the like that is ordinarily used is used for the remaining solid electrolyte compositions. This will also be true for a method described below.

In addition, it is also possible to manufacture an all-solid state secondary battery by carrying out the methods for forming the respective layers in a reverse order so as to form a negative electrode active material layer, a solid electrolyte layer, and a positive electrode active material layer on a negative electrode collector and overlaying a positive electrode collector thereon.

As another method, the following method can be exemplified. That is, a positive electrode sheet for an all-solid state secondary battery is produced as described above. In addition, a solid electrolyte composition containing a negative electrode active material is applied and heated as a material for a negative electrode onto a metal foil which is a negative electrode collector so as to form a negative electrode active material layer, thereby producing a negative electrode sheet for an all-solid state secondary battery. Next, a solid electrolyte layer is formed on the active material layer in any one of these sheets as described above. Furthermore, the other one of the positive electrode sheet for an all-solid state secondary battery and the negative electrode sheet for an all-solid state secondary battery is laminated on the solid electrolyte layer so that the solid electrolyte layer and the active material layer come into contact with each other. An all-solid state secondary battery can be manufactured as described above.

As still another method, the following method can be exemplified. That is, a positive electrode sheet for an all-solid state secondary battery and a negative electrode sheet for an all-solid state secondary battery are produced as described above. In addition, separately from the positive electrode sheet for an all-solid state secondary battery and the negative electrode sheet for an all-solid state secondary battery, a solid electrolyte composition is applied and heated onto a base material, thereby producing a solid electrolyte sheet for an all-solid state secondary battery consisting of a solid electrolyte layer. Furthermore, the positive electrode sheet for an all-solid state secondary battery and the negative electrode sheet for an all-solid state secondary battery are laminated together so as to sandwich the solid electrolyte layer that has been peeled off from the base material. An all-solid state secondary battery can be manufactured as described above.

<Formation of Individual Layers (Film Formation)>

The method for applying the solid electrolyte composition is not particularly limited and can be appropriately selected. Examples thereof include coating (preferably wet-type coating), spray coating, spin coating, dip coating, slit coating, stripe coating, and bar coating.

At this time, the solid electrolyte composition may be dried or heated respectively after being applied or may be dried or heated after being applied to multiple layers. The drying or heating temperature of the solid electrolyte composition of the embodiment of the present invention is set to a condition under which the compound (C) and the compound (D) polymerization-react with each other. The drying or heating temperature of the solid electrolyte composition being ordinarily used is not particularly limited. The lower limit is preferably 30° C. or higher, more preferably 60° C. or higher, and still more preferably 80° C. or higher. The upper limit is preferably 300° C. or lower, more preferably 250° C. or lower, and still more preferably 200° C. or lower. In a case in which the compositions are dried or heated in the above-described temperature range, it is possible to remove the solvent (G) and form a solid state. In addition, the temperature is not excessively increased, and the damage of the respective members of the all-solid state secondary battery can be prevented, which is preferable.

After the production of the applied solid electrolyte composition or the all-solid state secondary battery, the respective layers or the all-solid state secondary battery is preferably pressurized. In addition, the respective layers are also preferably pressurized in a state of being laminated together. Examples of the pressurization method include a hydraulic cylinder pressing machine and the like. The welding pressure is not particularly limited, but is, generally, preferably in a range of 50 to 1,500 MPa.

In addition, the applied solid electrolyte composition may be heated at the same time as pressurization. The heating temperature is not particularly limited, but is generally in a range of 30° C. to 300° C. The respective layers or the all-solid state secondary battery can also be pressed at a temperature higher than the glass transition temperature of the inorganic solid electrolyte.

The pressurization may be carried out in a state in which the solvent (G) has been dried in advance or in a state in which the solvent (G) remains.

The respective compositions may be applied at the same time, and the application, the drying, and the pressing may be carried out simultaneously and/or sequentially. The respective compositions may be applied to separate base materials and then laminated by means of transfer.

The atmosphere during the pressurization is not particularly limited and may be any one of in the atmosphere, under the dried air (the dew point: −20° C. or lower), in an inert gas (for example, in an argon gas, in a helium gas, or in a nitrogen gas), and the like.

The pressing time may be a short time (for example, within several hours) at a high pressure or a long time (one day or longer) under the application of an intermediate pressure. In the case of members other than the sheet for an all-solid state secondary battery, for example, the all-solid state secondary battery, it is also possible to use a restraining device (screw fastening pressure or the like) of the all-solid state secondary battery in order to continuously apply an intermediate pressure.

The pressing pressure may be a pressure that is constant or varies with respect to a portion under pressure such as a sheet surface.

The pressing pressure can be changed depending on the area or film thickness of the portion under pressure. In addition, it is also possible to change the same portion with a pressure that varies stepwise.

A pressing surface may be flat or roughened.

<Initialization>

The all-solid state secondary battery manufactured as described above is preferably initialized after the manufacturing or before the use. The initialization is not particularly limited, and it is possible to initialize the all-solid state secondary battery by, for example, carrying out initial charging and discharging in a state in which the pressing pressure is increased and then releasing the pressure up to a pressure at which the all-solid state secondary battery is ordinarily used.

[Usages of all-Solid State Secondary Battery]

The all-solid state secondary battery of the embodiment of the present invention can be applied to a variety of usages. Application aspects are not particularly limited, and, in the case of being mounted in electronic devices, examples thereof include notebook computers, pen-based input personal computers, mobile personal computers, e-book players, mobile phones, cordless phone handsets, pagers, handy terminals, portable faxes, mobile copiers, portable printers, headphone stereos, video movies, liquid crystal televisions, handy cleaners, portable CDs, mini discs, electric shavers, transceivers, electronic notebooks, calculators, portable tape recorders, radios, backup power supplies, memory cards, and the like. Additionally, examples of consumer usages include automobiles (electric cars and the like), electric vehicles, motors, lighting equipment, toys, game devices, road conditioners, watches, strobes, cameras, medical devices (pacemakers, hearing aids, shoulder massage devices, and the like), and the like. Furthermore, the all-solid state secondary battery can be used for a variety of military usages and universe usages. In addition, the all-solid state secondary battery can also be combined with solar batteries.

In the present invention, the all-solid state secondary battery refers to a secondary battery having a positive electrode, a negative electrode, and an electrolyte which are all composed of solid. In other words, the all-solid state secondary battery is differentiated from an electrolytic solution-type secondary battery in which a carbonate-based solvent is used as an electrolyte. In the present invention, among these, a polymer all-solid state secondary battery is premised. All-solid state secondary batteries are classified into an (organic) polymer all-solid state secondary battery in which, as an electrolyte, a polymer solid electrolyte (polymer electrolyte) obtained by dissolving an electrolyte salt such as LiTFSI in a polymer compound such as polyethylene oxide is used and an inorganic all-solid state secondary battery in which the Li—P—S-based glass or an inorganic solid electrolyte such as LLT and LLZ is used. The application of an inorganic compound to a polymer all-solid state secondary battery is not inhibited, and an inorganic compound can be applied as a positive electrode active material, a negative electrode active material, an inorganic solid electrolyte, and an additive.

The polymer solid electrolyte is differentiated from an inorganic solid electrolyte in which the above-described inorganic compound serves as the ion conductor and contains a polymer compound in which an electrolyte salt is dissolved as the ion conductor. The inorganic solid electrolyte does not emit a cation (Li ion) and exhibits an ion transportation function. In contrast, there is a case in which a material serving as an ion supply source that is added to an electrolytic solution or a solid electrolyte layer and emits a cation (Li ion) is referred to as an electrolyte. In the case of being differentiated from an electrolyte as the ion transportation material, the material is referred to as "electrolyte salt" or "supporting electrolyte". Examples of the electrolyte salt include LiTFSI.

EXAMPLES

Hereinafter, the present invention will be described in more detail on the basis of examples, and the present invention is not interpreted to be limited thereto. "Parts" and "%" that represent compositions in the following examples are mass-based unless particularly otherwise described.

Example 1

Production Example 1: Production of Solid Electrolyte Composition, Solid Electrolyte-Containing Sheet, and all-Solid State Secondary Battery (Preparation of solid electrolyte composition S-1)

Polyethylene oxide (PEO, Mw: 100,000, manufactured by Sigma-Aldrich, Co. LLC.) (2.5 g), lithium bis(trifluoromethanesulfonyl)imide (LiTFSI, manufactured by Wako Pure Chemical Industries, Ltd.) (1.0 g), tris(2-aminoethyl)amine (TAEA, manufactured by Wako Pure Chemical Industries, Ltd.) (0.133 g), butylene glycol diglycidyl ether (BDGE, manufactured by Wako Pure Chemical Industries, Ltd.) (0.277 g), and acetonitrile (manufactured by Wako Pure Chemical Industries, Ltd.) (25 g) were added to a 50 mL sample bottle and dissolved at 25° C., thereby obtaining a solid electrolyte composition S-1.

(Production of Solid Electrolyte-Containing Sheet SS-1)

The obtained solid electrolyte composition S-1 was applied onto a polytetrafluoroethylene (PTFE) sheet using an applicator (trade name: SA-201 Baker-type applicator, manufactured by Tester Sangyo Co., Ltd.). The applied solid electrolyte composition S-1 was dried in a nitrogen atmosphere at 100° C. for 30 minutes and further dried by blasting at 80° C. for two hours. An amino group of TAEA and an epoxy group of BDGE were caused to react with each other in the presence of PEO and LiTFSI as described above. A solid electrolyte layer having an ion conductor made up of PEO and LiTFSI and a matrix portion made of a crosslinked polymer having an 1,2-amino alcohol structure as a crosslinking structure was formed as described above. A solid electrolyte-containing sheet SS-1 including the solid electrolyte layer having a layer thickness of 150 μm was obtained as described above.

(Production of all-Solid State Secondary Battery SB-1)

—Production of Positive Electrode Sheet for all-Solid State Secondary Battery—

Acetylene black (DENKA BLACK (trade name), manufactured by Denka Company Limited) (0.82 g) and N-methyl pyrrolidone (NMP, manufactured by Wako Pure Chemical Industries, Ltd.) (5.51 g) were added to a 50 mL sample bottle and mixed together using a planetary centrifugal mixer (ARE-310 (trade name), manufactured by Thinky Corporation) at room temperature (25° C.) and 2,000 rpm for five minutes. Subsequently, LiFePO$_4$ (LFP, manufactured by Hohsen Corp.) (10.94 g) and NMP (2.01 g) were added thereto and mixed together using the planetary centrifugal mixer at room temperature (25° C.) and 2,000 rpm for two minutes. After that, PVdF (KYNAR301F (trade name), manufactured by Arkema K.K.) (0.23 g) and NMP (7.75 g) were added thereto and mixed together using the planetary centrifugal mixer at room temperature (25° C.) and 2,000 rpm for two minutes. The obtained slurry was applied onto a 20 μm-thick stainless steel foil using the applicator: SA-201 (trade name) and dried by blasting at 100° C. for two hours. The obtained sheet was pressed at 5 kN/cm using a roll pressing machine, thereby producing a positive electrode sheet for an all-solid state secondary battery in which the layer thickness of a positive electrode active material layer was 30 μm.

—Production of all-Solid State Secondary Battery SB-1—

Hereinafter, the production of an all-solid state secondary battery SB-1 will be described with reference to FIG. 2.

A Li foil (thickness: 100 μm, manufactured by Honjo Metal Co., Ltd.) cut out in a disc shape having a diameter of 15 mm was put into a 2032-type stainless steel coin case 16 in which a spacer and a washer (both not illustrated in FIG. 2) were combined together. Next, the solid electrolyte-containing sheet from which the PTFE sheet was peeled off (solid electrolyte layer) SS-1 cut out in a disc shape having a diameter of 16 mm was overlaid on the Li foil so that the Li foil and the solid electrolyte layer came into contact with each other. Furthermore, the positive electrode sheet for an all-solid state secondary battery cut out in a disc shape having a diameter of 13 mm was overlaid on the solid electrolyte layer so that the solid electrolyte layer and the positive electrode active material layer came into contact with each other, thereby producing an all-solid state secondary battery 18. A solid electrolyte sheet for an all-solid state secondary battery 17 in the 2032-type coin case had a laminate structure of the Li foil, the solid electrolyte layer, the positive electrode active material layer, and the aluminum foil.

Production Examples 2 to 10: Production of Solid Electrolyte Compositions, Solid Electrolyte-Containing Sheets, and all-Solid State Secondary Batteries (Preparation of Solid Electrolyte Composition)

Solid electrolyte compositions S-2 to S-10 were respectively prepared in the same manner as the solid electrolyte composition S-1 except for the fact that the respective components and the amounts thereof used were changed as shown in Table 3-1.

Solid electrolyte-containing sheets SS-2 to SS-10 and all-solid state secondary batteries SB-2 to SB-10 were respectively produced in the same manner as the electrolyte sheet for an all-solid state secondary battery SS-1 and the all-solid state secondary battery SB-1 except for the fact that the obtained solid electrolyte compositions S-2 to S-10 were respectively used instead of the solid electrolyte composition S-1.

In the preparation of the respective solid electrolyte compositions described above, unless particularly otherwise described, components not shown in Table 3-1 and amounts thereof used were not changed.

In the solid electrolyte-containing sheets, the matrix portion that was contained together with the ion conductor was made of a crosslinked polymer having an 1,2-amino alcohol structure as the crosslinking structure in the solid electrolyte-containing sheets SS-2 to SS-6, SS-9, and SS-10, was made of a crosslinked polymer having an urethane bond as the crosslinking structure in the solid electrolyte-containing sheet SS-7, and as made of a crosslinked polymer having an ester bond as the crosslinking structure in the solid electrolyte-containing sheet SS-8.

<Production of Solid Electrolyte Compositions, Solid Electrolyte-Containing Sheets, and all-Solid State Secondary Batteries for Comparative Examples>

(1) Preparation and the Like of Solid Electrolyte Compositions T-1 and T-2.

A solid electrolyte composition T-1 was prepared according to Example 1-2 described in JP2003-229019A. A solid electrolyte-containing sheet TS-1 and an all-solid state secondary battery TB-1 were produced in the same manner as the electrolyte sheet for an all-solid state secondary battery SS-1 and the all-solid state secondary battery SB-1 except for the fact that the obtained solid electrolyte composition T-1 was used instead of the solid electrolyte composition S-1.

In addition, a solid electrolyte composition T-2 was prepared in a mass proportion shown in Table 3-1 according to Example 1 described in JP2000-222939A (the ratio of Si-LE-2 described below was set to the same as that in Example 1-2 of JP2003-229019A. That is, the molar numbers of oxygen atoms in ether units that the respective liquid siloxane derivatives included were added to "the molar number of oxygen atoms in the ether unit" that served as a criterion of the amount of the electrolyte salt (C) used.). A solid electrolyte-containing sheet TS-2 and all-solid state secondary batteries TB-2 were produced in the same manner as the electrolyte sheet for an all-solid state secondary battery SS-1 and the all-solid state secondary battery SB-1 except for the fact that the obtained solid electrolyte composition T-2 was used instead of the solid electrolyte composition S-1.

In the preparation of the respective solid electrolyte compositions T-1 and T-2, unless particularly otherwise described, components not shown in Table 3-1 and amounts thereof used were not changed.

The components used in the solid electrolyte compositions T-1 and T-2 did not correspond to the polymer (A) and the compound (C), but these components are shown in the same column of Table 3-1 for convenience.

(2) Preparation and the Like of Solid Electrolyte Composition T-3

A solid electrolyte composition T-3 was prepared in the same manner as the solid electrolyte composition S-1 except for the fact that the respective components and the amounts thereof used were changed as shown in Table 3-1.

A solid electrolyte-containing sheet TS-3 and an all-solid state secondary battery TB-3 were respectively produced in the same manner as the electrolyte sheet for an all-solid state secondary battery SS-1 and the all-solid state secondary battery SB-1 except for the fact that the obtained solid electrolyte composition T-3 was used instead of the solid electrolyte composition S-1.

In the preparation of the solid electrolyte compositions described above, unless particularly otherwise described, components not shown in Table 3-1 and amounts thereof used were not changed.

In the solid electrolyte-containing sheet TS-3, a matrix portion contained together with an ion conductor was made of a linear polymer having an ester bond.

(3) Preparation and the Like of Solid Electrolyte Composition T-4

As a solid electrolyte composition T-4 for comparison, TAEA and BDGE were caused to polymerization-react in advance in the same amount as in the solid electrolyte composition S-1, thereby synthesizing a reactant of TAEA and BDGE. This reactant, PEO, and LiTFSI were mixed together in the same amounts used as in the solid electrolyte composition S-1. However, it was not possible to uniformly mix the reactant, PEO, and LiTFSI together and to prepare the solid electrolyte composition T-4.

<Measurement of Solid Electrolyte Compositions and Solid Electrolyte-Containing Sheets>

(Computation of mass ratio of contents of individual components) The mass ratios of the contents of the polymer (A), the electrolyte salt (B), the compound (C), and the compound (D) in the respective solid electrolyte compositions S-1 to S-10 and T-1 to T-3 were computed on the basis of the amounts used of the respective components used for the preparation of the respective solid electrolyte compositions. These results are shown in Table 3-1.

(Computation of Ratio $R^G$ of Polymerization Reactive Groups)

The ratios $R^G$ of the polymerization reactive groups in the respective solid electrolyte compositions S-1 to S-10 and T-3 were computed on the basis of Expression ($R^G$) which is based on the contents (moles) of the compounds (C) and (D) used for the preparation of the respective solid electrolyte compositions. These results are shown in Table 3-1.

(Measurement of Concentration of Solid Content)

The concentrations of the solid content in the respective solid electrolyte compositions S-1 to S-10 and T-1 to T-3 were computed on the basis of the amounts used of the respective components used for the preparation of the respective solid electrolyte compositions. These results are shown in Table 3-1.

(Measurement of Content of Volatile Component)

The contents of a volatile component in the respective solid electrolyte-containing sheets SS-1 to SS-10 and TS-1 to TS-3 were measured in the following manner. That is, the solid electrolyte-containing sheet a mass W1 of which had been measured in advance was left to stand in a vacuum (pressure of 10 Pa or lower) environment at 250° C. for four hours. After that, a mass W2 of the solid electrolyte-containing sheet was measured. The content of a volatile component in the solid electrolyte-containing sheet was computed on the basis of the following expression from the masses W1 and W2 before and after the solid electrolyte-containing sheet was left to stand. These results are shown in Table 3-2.

Content of volatile component (% by mass): (W1−W2)/W1

<Battery Performance Test>

(Measurement of Ion Conductivity)

Hereinafter, a method for measuring ion conductivity will be described with reference to FIG. 2.

Figure 2:
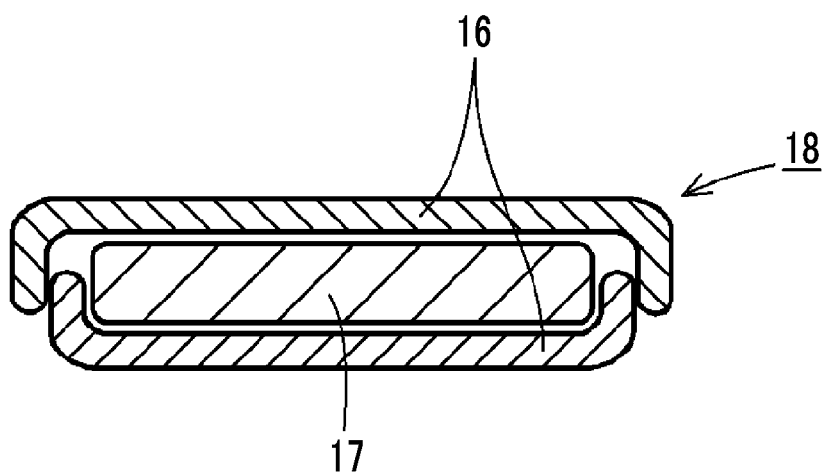
FIG. 2 is a vertical cross-sectional view schematically illustrating a coin-shaped all-solid state secondary battery produced in an example.

A disc-shaped specimen having a diameter of 14.5 mm was cut out from each of the solid electrolyte-containing sheets SS-1 to SS-10 or TS-1 to TS-3 obtained above, the PTFE sheet was peeled off, and the specimen was put into a coin case 16 as a solid electrolyte sheet for an all-solid state secondary battery 17 shown in FIG. 2. Specifically, an aluminum foil cut out in a disc shape having a diameter of 15 mm (not shown in FIG. 2) was brought into contact with the solid electrolyte layer of the solid electrolyte-containing sheet and put into the 2032-type stainless steel coin case 16 by combining a spacer and a washer (both not illustrated in FIG. 2) together. The coin case 16 was swaged, thereby producing an all-solid state secondary battery for ion conductivity measurement 18.

Ion conductivity was measured using the obtained all-solid state secondary battery for ion conductivity measurement 18. Specifically, the alternating current impedance was measured at a voltage magnitude of 5 mV and frequencies of 1 MHz to 1 Hz using 1255B FREQUENCY RESPONSE ANALYZER (trade name) manufactured by Solartron Analytical in a constant-temperature tank (60° C.). Therefore, the resistance of the specimen in the film thickness direction was obtained, and the ion conductivity was obtained by calculation using the following expression.

Ion conductivity (mS/cm)=1,000×film thickness of specimen (cm)/(resistance (Ω)×area of specimen (cm²))    Expression (A)

In Expression (A), the film thickness of the specimen and the area of the specimen are values measured before the solid electrolyte-containing sheet was put into the 2032-type coin case 16.

Which evaluation rank described below the obtained ion conductivity was included was determined, and the results are shown in Table 3-2. In the present test, the ion conductivity with an evaluation rank "6" or higher is pass.

—Evaluation Rank—
8: $2 \times 10^{-4}$ S/cm or more
7: $1 \times 10^{-4}$ S/cm or more and less than $2 \times 10^{-4}$ S/cm
6: $7 \times 10^{-5}$ S/cm or more and less than $1 \times 10^{-4}$ S/cm
5: $4 \times 10^{-5}$ S/cm or more and less than $7 \times 10^{-5}$ S/cm
4: $1 \times 10^{-5}$ S/cm or more and less than $4 \times 10^{-5}$ S/cm
3: $5 \times 10^{-6}$ S/cm or more and less than $1 \times 10^{-5}$ S/cm
2: $1 \times 10^{-6}$ S/cm or more and less than $5 \times 10^{-6}$ S/cm
1: Less than $1 \times 10^{-6}$ S/cm

[Evaluation of Durability]

The obtained all-solid state secondary batteries SB-1 to SB-10 or TB-1 to TB-3 were evaluated at 60° C. using a potentiostat (1470 (trade name), manufactured by Solartron Analytical). The evaluation was carried out by discharging, and the discharging was carried out until the battery voltage reached 1.0 V at a current density of 0.2 mA/cm². Charging was carried out until the battery voltage reached 2.5 V at a current density of 0.2 mA/cm². This charging and discharging was regarded as one cycle. This charging and discharging was repeated, and durability was evaluated using the number of cycles at which a voltage abnormal behavior appeared for the first time.

The voltage abnormal behavior in the present test was regarded to appear in a case in which the charging curve curved during charging and voltage drop was confirmed or a case in which the charging and discharging efficiency reached 97% or less.

Which evaluation rank described below the number of cycles at which the voltage abnormal behavior was confirmed was included was determined, and the results are shown in Table 3-2. In the present test, the durability with an evaluation rank "5" or higher is pass.

—Evaluation Rank—
8: 500 Cycles or more
7: 300 Cycles or more and less than 500 cycles
6: 200 Cycles or more and less than 300 cycles
5: 100 Cycles or more and less than 200 cycles
4: 70 Cycles or more and less than 100 cycles
3: 40 Cycles or more and less than 70 cycles
2: 20 Cycles or more and less than 40 cycles
1: Less than 20 cycles

TABLE 3-1

| Solid electrolyte composition No. | Polymer (A) | Electrolyte salt (B) | Compound (C) | | Compound (D) | | Other components | Ratio | | Concentration of solid content (% by mass) | Note |
|---|---|---|---|---|---|---|---|---|---|---|---|
| | | | Name of compound | Reactive group | Name of compound | Polymerization reactive group | | $R^G$ of reactive group | Mass ratio of (A):(B):(C):(D) | | |
| S-1 | PEO(10) | LiTFSI | TAEA (3) | Amino group | BDGE (2) | Epoxy group | — | 1 | 1:0.4:0.05:0.11 | 14 | Present Invention |
| S-2 | PEO(10) | LiTFSI | TAEA (3) | Amino group | TMPTGE (3) | Epoxy group | — | 1 | 1:0.4:0.05:0.11 | 14 | Present Invention |
| S-3 | PEO(10) | LiTFSI | TAEA (3) | Amino group | TMPTGE (3) | Epoxy group | — | 1 | 1:0.4:0.10:0.22 | 14 | Present Invention |
| S-4 | PEO(60) | LiTFSI | TAEA (3) | Amino group | TMPTGE (3) | Epoxy group | — | 1 | 1:0.4:0.05:0.11 | 14 | Present Invention |
| S-5 | PEG(06) | LiTFSI | TAEA (3) | Amino group | TMPTGE (3) | Epoxy group | — | 1 | 1:0.4:0.05:0.11 | 14 | Present Invention |
| S-6 | PEO(10) | LiTFSI | TAEA (3) | Amino group | TMPTGE (3) | Epoxy group | — | 0.5 | 1:0.4:0.05:0.22 | 14 | Present Invention |
| S-7 | PEO(10) | LiTFSI | TMP (3) | Hydroxy group | MDI (2) | Isocyanate group | — | 1 | 1:0.4:0.05:0.15 | 14 | Present Invention |
| S-8 | PEO(10) | LiTFSI | TMP (3) | Hydroxy group | SBC (2) | Haloformyl group | — | 1 | 1:0.4:0.05:0.13 | 14 | Present Invention |
| S-9 | PEO(10) | LiFSI | TAEA (3) | Amino group | TMPTGE (3) | Epoxy group | — | 1 | 1:0.4:0.10:0.22 | 14 | Present Invention |
| S-10 | PA(14.5) | LiTFSI | TAEA (3) | Amino group | TMPTGE (3) | Epoxy group | — | 1 | 1:0.4:0.10:0.22 | 14 | Present Invention |
| T-1 | PEO(100) | LiTFSI | TMPTA (3) | Acryloyl group | — | — | Si-LE-1 | — | 1:0.2:0.36:0 | 92 | Comparative Example |
| T-2 | PEGMA | LiTFSI | PEGDMA (1) | Acryloyl group | — | — | Si-LE-2 | — | 1:1:0.4:0 | 9.6 | Comparative Example |
| T-3 | PEO(10) | LiTFSI | HMG (2) | Hydroxy group | SBC (2) | Haloformyl group | — | 1 | 1:0.4:0.07:0.13 | 14 | Comparative Example |

TABLE 3-2

| Solid electrolyte composition No. | Solid electrolyte-containing sheet | | All-solid state secondary battery | | | Note |
|---|---|---|---|---|---|---|
| | No. | Content of volatile component (% by mass) | No. | Ion conductivity | Durability | |
| S-1 | SS-1 | 1.4 | SB-1 | 7 | 7 | Present Invention |
| S-2 | SS-2 | 0.8 | SB-2 | 8 | 7 | Present Invention |

TABLE 3-2-continued

| Solid electrolyte composition No. | Solid electrolyte-containing sheet No. | Content of volatile component (% by mass) | All-solid state secondary battery No. | Ion conductivity | Durability | Note |
|---|---|---|---|---|---|---|
| S-3 | SS-3 | 1.1 | SB-3 | 7 | 8 | Present Invention |
| S-4 | SS-4 | 0.9 | SB-4 | 8 | 8 | Present Invention |
| S-5 | SS-5 | 0.7 | SB-5 | 8 | 5 | Present Invention |
| S-6 | SS-6 | 1.2 | SB-6 | 8 | 5 | Present Invention |
| S-7 | SS-7 | 1.3 | SB-7 | 7 | 6 | Present Invention |
| S-8 | SS-8 | 1.7 | SB-8 | 6 | 6 | Present Invention |
| S-9 | SS-9 | 1.1 | SB-9 | 7 | 8 | Present Invention |
| S-10 | SS-10 | 1.1 | SB-10 | 6 | 5 | Present Invention |
| T-1 | TS-1 | 0.7 | TB-1 | 6 | 1 | Comparative Example |
| T-2 | TS-2 | 0.4 | TB-2 | 2 | 1 | Comparative Example |
| T-3 | TS-3 | 0.5 | TB-3 | 6 | 2 | Comparative Example |

<Notes of Table>
(A): Polymer (A)
(B): Electrolyte salt (B)
(C): Compound (C)
(D): Compound (D)

In the compound (C) column and the compound (D) column of Table 3-1, numerical values in parenthesis after the abbreviations of compounds indicate the number of the polymerization reactive groups in one molecule.

—Abbreviation of Compounds—
PEO (10): Polyethylene oxide (Mw: 100,000)
PEO (60): Polyethylene oxide (Mw: 600,000)
PEG (06): Polyethylene glycol (Mw: 6,000)
PEO (100): Polyethylene oxide (Mw: 1,000,000)
PA (14.5): A polymer synthesized under the following conditions Poly(ethylene glycol) methyl ether acrylate (number average molecular weight: 5,000, manufactured by Sigma-Aldrich, Co. LLC.) (22.4 g), a polymerization initiator V-601 (trade name, manufactured by Wako Pure Chemical Industries, Ltd.) (0.2 g), and tetrahydrofuran (30.0 g) were mixed together, thereby preparing a liquid mixture. Next, a reflux cooling tube and a gas introduction coke were attached thereto, nitrogen gas was introduced thereto at a flow rate of 200 mL/min for 10 minutes, then, the prepared liquid mixture was added dropwise to a 200 mL three-neck flask heated to 80° C. for two hours and then further stirred at 80° C. for two hours. The obtained solution was added to ethanol (500 g), and the obtained solid was dried in a vacuum at 60° C. for five hours, thereby obtaining PA. The mass average molecular weight of the obtained PA was 145,000.

TAEA: Tris(2-aminoethyl)amine
BDGE: 1,4-Butanediol diglycidyl ether
TMPGE: Trimethylolpropane triglycidyl ether
TMP: Trimethylolpropane
MDI: methylene diphenyl 4,4'-diisocyanate
SBC: Suberoyl chloride
HMG: Hexamethylene glycol Si-LE-1: Liquid siloxane derivative illustrated below (Mw: 779)
Si-LE-2: Liquid siloxane derivative illustrated below (Mw: 3,764)
LiTFSI: Lithium bis(trifluoromethanesulfonyl)imide: LiN(CF$_3$SO$_2$)$_2$
LiFSI: Lithium bis(fluorosulfonyl)imide: LiN(FSO$_2$)$_2$
TMPTA: Trimethylolpropane triacrylate
PEGMA: Methoxypolyethylene glycol monomethacrylate (Mw: 496)
PEGDMA: Polyethylene glycol dimethacrylate (Mw: 536)

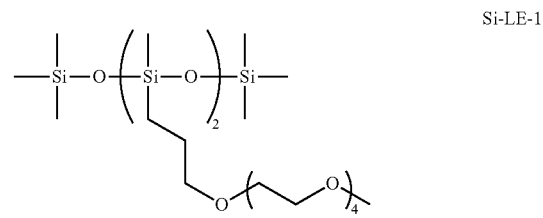

Si-LE-1

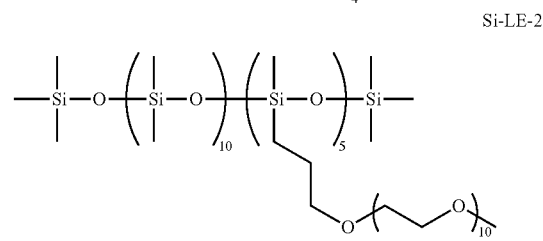

Si-LE-2

The following facts are found from the results shown in Table 3-1 and Table 3-2.

The solid electrolyte composition T-1 not containing the compound (D) and the solid electrolyte composition T-2 not containing the polymer (A) were both not capable of imparting a high ion conductivity and excellent durability to the all-solid state secondary batteries. In addition, it is found that the solid electrolyte composition T-3 which contained the polymer (A) an the electrolyte salt (B), but did not contain the compound (C) and contained only the compound having only two polymerization reactive groups was not capable of improving the durability of the all-solid state secondary battery. Furthermore, in a case in which the compound (C) and the compound (D) were caused to react with each other in advance to produce a reactant, even the solid electrolyte composition T-4 could not be prepared.

In contrast, the solid electrolyte compositions S-1 to S-10 of the present invention containing the polymer (A), the electrolyte salt (B), the compound (C), and the compound (D) were all capable of imparting a high ion conductivity and durability to the all-solid state secondary batteries on a high level. This is assumed to be because, in the solid electrolyte compositions S-1 to S-10, the ion conductor and the matrix portion were formed due to the polymerization reaction between the compound (C) and the compound (D) in the presence of the polymer (A) and the electrolyte salt (B) during the production of the solid electrolyte-containing sheet in a state in which the ion conductor and the matrix portion exhibited an interaction.

Particularly, the solid electrolyte composition S-1 to S-9 contains PEO, which is generally said to have a low mechanical strength, as the polymer (A). However, all of the solid electrolyte compositions contained the electrolyte salt (B), the compound (C), and the compound (D) in addition to the polymer (A) and were capable of developing a high durability in the all-solid state secondary batteries while maintaining a high ion conductivity. In addition, all of the all-solid state secondary batteries SB-1 to SB-10 of the present invention included the Li foil, which is generally said to easily generate lithium dendrite and degrade the durability of batteries, as the negative electrode. However, it is found that the solid electrolyte layers of these all-solid state secondary batteries were formed of the solid electrolyte compositions S-1 to S-10 of the present invention and thus exhibited a high durability even in the case of including the Li foil as the negative electrode.

Example 2

In Example 2, a solid electrolyte composition containing a sulfide-based inorganic solid electrolyte as the inorganic solid electrolyte (E), a solid electrolyte-containing sheet and an all-solid state secondary battery in which the solid electrolyte composition was used were prepared or produced, and the battery performance of the all-solid state secondary battery was evaluated.

(Synthesis of Sulfide-Based Inorganic Solid Electrolyte)

In a glove box under an argon atmosphere (dew point: −70° C.), lithium sulfide ($Li_2S$, manufactured by Sigma-Aldrich, Co. LLC., Purity: >99.98%) (2.42 g) and diphosphorus pentasulfide ($P_2S_5$, manufactured by Sigma-Aldrich, Co. LLC., Purity: >99%) (3.90 g) were respectively weighed, injected into an agate mortar, and mixed using an agate muddler for five minutes. The mixing ratio between $Li_2S$ and $P_2S_5$ ($Li_2S:P_2S_5$) was set to 75:25 in terms of molar ratio.

Zirconia beads (66 g) having a diameter of 5 mm were injected into a 45 mL zirconia container (manufactured by Fritsch Japan Co., Ltd.), the full amount of the mixture of the lithium sulfide and the diphosphorus pentasulfide was injected thereinto, and the container was sealed in an argon atmosphere. The container was set in a planetary ball mill P-7 (trade name, manufactured by Fritsch Japan Co., Ltd.) mechanical milling was carried out at a temperature of 25° C. and a rotation speed of 510 rpm for 20 hours, thereby obtaining yellow powder (6.20 g) of a sulfide-based inorganic solid electrolyte (LPS).

The synthesized LPS (70 parts by mass) was added to the solid electrolyte composition S-3 (100 parts by mass), thereby preparing a solid electrolyte composition S-3 (LPS).

A solid electrolyte-containing sheet SS-3 (LPS) and an all-solid state secondary battery SB-3 (LPS) were respectively produced in the same manner as the electrolyte sheet for an all-solid state secondary battery SS-3 and the all-solid state secondary battery SB-3 except for the fact that the obtained solid electrolyte composition S-3 (LPS) was used instead of the solid electrolyte composition S-3.

The produced solid electrolyte-containing sheet SS-3 (LPS) and all-solid state secondary battery SB-3 (LPS) were evaluated in the same manner as in the evaluation of the ion conductivity and the evaluation of the durability. As a result, for the ion conductivity and the durability, the same excellent results as those of the solid electrolyte-containing sheet SS-3 and the all-solid state secondary battery SB-3 were obtained.

Example 3

In Example 3, a solid electrolyte composition containing an oxide-based inorganic solid electrolyte as the inorganic solid electrolyte (E), a solid electrolyte-containing sheet and an all-solid state secondary battery in which the solid electrolyte composition was used were prepared or produced, and the battery performance of the all-solid state secondary battery was evaluated.

A solid electrolyte composition S-3 (LLT) was prepared in the same manner as the solid electrolyte composition S-3 (LPS) except for the fact that $La_{0.55}Li_{0.35}TiO_3$ (LLT, manufactured by Toshima Manufacturing Co., Ltd.) was used instead of LPS.

A solid electrolyte-containing sheet SS-3 (LLT) and an all-solid state secondary battery SB-3 (LLT) were respectively produced in the same manner as the electrolyte sheet for an all-solid state secondary battery SS-3 and the all-solid state secondary battery SB-3 except for the fact that the obtained solid electrolyte composition S-3 (LLT) was used instead of the solid electrolyte composition S-3.

The produced solid electrolyte-containing sheet SS-3 (LLT) and all-solid state secondary battery SB-3 (LLT) were evaluated in the same manner as in the evaluation of the ion conductivity and the evaluation of the durability. As a result, for the ion conductivity and the durability, the same excellent results as those of the solid electrolyte-containing sheet SS-3 and the all-solid state secondary battery SB-3 were obtained.

Example 4

In Example 4, a solid electrolyte composition containing the active material (F), a solid electrolyte-containing sheet and an all-solid state secondary battery in which the solid electrolyte composition was used were prepared or produced, and the battery performance of the all-solid state secondary battery was evaluated.

(Preparation of Composition for Positive Electrode)

Acetylene black (DENKA BLACK (trade name), manufactured by Denka Company Limited) (0.82 g) and NMP (manufactured by Wako Pure Chemical Industries, Ltd.) (5.51 g) were added to a 50 mL sample bottle, PEO (Mw: 100,000, manufactured by Sigma-Aldrich, Co. LLC.) (1.0 g), lithium bis(trifluoromethanesulfonyl)imide (LiTFSI (manufactured by Wako Pure Chemical Industries, Ltd.)) (0.4 g), tris(2-aminoethyl)amine (TAEA, manufactured by Wako Pure Chemical Industries, Ltd.) (0.05 g), and butylene glycol diglycidyl ether (BDGE, manufactured by Wako Pure Chemical Industries, Ltd.) (0.11 g) were added thereto, and the components were mixed together using a planetary centrifugal mixer (ARE-310 (trade name), manufactured by Thinky Corporation) at room temperature (25° C.) and 2,000 rpm for five minutes. Subsequently, LFP (manufactured by Hohsen Corp.) (10.94 g) and NMP (2.01 g) were added thereto and mixed together using the planetary centrifugal mixer at room temperature (25° C.) and 2,000 rpm for two minutes. After that, PVdF (KYNAR301F (trade name), manufactured by Arkema K.K.) (0.23 g) and NMP (7.75 g) were added thereto and mixed together using the planetary centrifugal mixer at room temperature (25° C.) and 2,000 rpm for two minutes, thereby obtaining a composition for a positive electrode (solid electrolyte composition) SS-1 (LFP).

The obtained composition for a positive electrode SS-1 (LFP) was applied onto a 20 μm-thick aluminum foil using an applicator (trade name: SA-201, Baker-type applicator, manufactured by Tester Sangyo Co., Ltd.) and dried by blasting at 100° C. for two hours. An amino group of TAEA and an epoxy group of BDGE were caused to react with each other in the presence of PEO and LiTFSI as described above. A solid electrolyte layer having an ion conductor made up of PEO and LiTFSI and a matrix portion having an 1,2-amino alcohol structure was formed as described above. The layer was pressed at 5 kN/cm using a roll pressing machine, thereby producing a positive electrode sheet for an all-solid state secondary battery SS-1 (LFP). The layer thickness of a positive electrode active material layer was 30 µm.

In addition, for the all-solid state secondary battery (A) produced in the same manner as in the all-solid state secondary battery SB-1 except for the fact that, in the production of the all-solid state secondary battery SB-1, the obtained positive electrode sheet for an all-solid state secondary battery SS-1 (LFP) was used instead of the positive electrode sheet for an all-solid state secondary battery, the above-described durability was evaluated. The all-solid state secondary battery (A) exhibited excellent durability. In addition, it was confirmed that the battery voltage after 10 seconds of discharging during the third discharging in the durability test was high, the resistance was lower than that of the all-solid state secondary battery SB-1, and the all-solid state secondary battery was also excellent in terms of the resistance.

The present invention has been described together with the embodiment; however, unless particularly specified, the present inventors do not intend to limit the present invention to any detailed portion of the description and consider that the present invention is supposed to be broadly interpreted within the concept and scope of the present invention described in the claims.

The present application claims priority on the basis of JP2017-141738 filed on Jul. 21, 2017 in Japan, the content of which is all incorporated herein by reference.

EXPLANATION OF REFERENCES

1: negative electrode collector
2: negative electrode active material layer
3: solid electrolyte layer
4: positive electrode active material layer
5: positive electrode collector
6: operation portion
10: all-solid state secondary battery
16: 2032-type coin case
17: solid electrolyte sheet for all-solid state secondary battery or all-solid state secondary battery sheet
18: all-solid state secondary battery

What is claimed is:

1. A solid electrolyte composition comprising:
a polymer (A) having a mass average molecular weight of 5,000 or more, wherein the polymer is at least one selected from the group consisting of polyether, polysiloxane, polyester, polycarbonate, polyurethane, polyurea, or polyacrylate;
an electrolyte salt (B) having an ion of a metal belonging to Group I or II of the periodic table;
a compound (C) having three or more polymerization reactive groups; and
a compound (D) having two or more polymerization reactive groups that are polymerization reactive groups different from the polymerization reactive group that the compound (C) has and are capable of causing a polymerization reaction with the polymerization reactive group that the compound (C) has, wherein
a ratio $R^G$ of a polymerization reactive group prescribed by Expression ($R^G$) is more than 0.8 and less than 1.2, Expression ($R^G$): $R^G$=[the number of the polymerization reactive groups in one molecule of the compound (C)×the content (mol) of the compound (C) in the solid electrolyte composition]/[the number of the polymerization reactive groups in one molecule of the compound (D)×the content (mol) of the compound (D) in the solid electrolyte composition].

2. The solid electrolyte composition according to claim 1, wherein the polymerization reactive group that the compound (C) has and the polymerization reactive group that the compound (D) has are respectively one polymerization reactive group selected from a group of polymerization reactive groups (a), <group of polymerization reactive groups (a)>
a hydroxy group, an amino group, a carboxy group, an alkoxycarbonyl group, a haloformyl group, a sulfo group, a carbamoyl group, a formyl group, an isocyanate group, an oxetane group, an epoxy group, a dicarboxylic anhydride group, a silyl group, an alkynyl group, an alkenyl group, a bromo group, a chloro group, an iodine group, a diazo group, an azido group, and a nitrile oxide group.

3. The solid electrolyte composition according to claim 1, wherein a combination of the polymerization reactive group that the compound (C) has and the polymerization reactive group that the compound (D) has is any one of combinations (C1) to (C9) below, <combinations of polymerization reactive groups>
(C1) an amino group and a carboxy group, (C2) an amino group and an isocyanate group,
(C3) an amino group and an oxetane group, (C4) an amino group and an epoxy group,
(C5) an amino group and a dicarboxylic anhydride group, (C6) an epoxy group and a carboxy group,
(C7) an azido group and an alkynyl group, (C8) a nitrile oxide group and an alkynyl group, and
(C9) a hydroxy group and an isocyanate group.

4. The solid electrolyte composition according to claim 1, wherein the combination of the polymerization reactive group that the compound (C) has and the polymerization reactive group that the compound (D) has is any one of combinations (C3), (C4), and (C6) to (C8) below, <combinations of polymerization reactive groups>
(C3) an amino group and an oxetane group, (C4) an amino group and an epoxy group,
(C6) an epoxy group and a carboxy group, (C7) an azido group and an alkynyl group, and
(C8) a nitrile oxide group and an alkynyl group.

5. The solid electrolyte composition according to claim 1, wherein a mass ratio of contents of the polymer (A), the electrolyte salt (B), the compound (C), and the compound (D) in the solid electrolyte composition is 1:0.05 to 2.50:0.04 to 2:0.04 to 2 (the polymer (A):the electrolyte salt (B):the compound (C):the compound (D)).

6. The solid electrolyte composition according to claim 1, wherein the compound (D) has three or more of the polymerization reactive groups.

7. The solid electrolyte composition according to claim 1, further comprising:
an inorganic solid electrolyte (E).

8. The solid electrolyte composition according to claim 1, further comprising:
an active material (F).

9. The solid electrolyte composition according to claim 1, further comprising:

a solvent (G).

10. The solid electrolyte composition according to claim 9, wherein a concentration of a solid content is 5% to 40% by mass.

11. A solid electrolyte-containing sheet comprising:

a layer constituted of the solid electrolyte composition according to claim 1.

12. The solid electrolyte-containing sheet according to claim 11, comprising:

the polymer (A);

the electrolyte salt (B); and a reactant of the compound (C) and the compound (D).

13. An all-solid state secondary battery comprising:

a positive electrode active material layer;

a negative electrode active material layer; and a solid electrolyte layer between the positive electrode active material layer and the negative electrode active material layer, wherein at least one of the positive electrode active material layer, the negative electrode active material layer, or the solid electrolyte layer is a layer constituted of the solid electrolyte composition according to claim 1.

14. The all-solid state secondary battery according to claim 13, wherein at least one of the positive electrode active material layer, the negative electrode active material layer, or the solid electrolyte layer contains an inorganic solid electrolyte.

15. The all-solid state secondary battery according to claim 13, wherein the negative electrode active material layer is a lithium layer.

16. A method for manufacturing a solid electrolyte-containing sheet, the method comprising:

causing a polymerization reaction of the compound (C) and the compound (D) in the presence of the polymer (A) and the electrolyte salt (B) in the solid electrolyte composition according to claim 1.

17. A method for manufacturing an all-solid state secondary battery, wherein the all-solid state secondary battery is manufactured using the manufacturing method according to claim 16.

18. The solid electrolyte composition according to claim 1, wherein the polyether is a polymer compound having a repeating unit represented by Formula (1-1)

(1-1)

and $L^1$ represents a linking group and is an alkylene group having 1 to 12 carbon atoms, an alkenylene group having 2 to 12 carbon atoms, an arylene group having 6 to 22 carbon atoms, or a group formed of a combination thereof.

* * * * *